United States Patent
Yu et al.

(10) Patent No.: US 9,867,057 B2
(45) Date of Patent: Jan. 9, 2018

(54) COMMUNICATION MECHANISM USING SPECTRUM SHARING

(71) Applicant: NOKIA SOLUTIONS AND NETWORKS OY, Espoo (FI)

(72) Inventors: Ling Yu, Oulu (FI); Kari Veikko Horneman, Oulu (FI)

(73) Assignee: Nokia Solutions and Networks OY, Espoo (FI)

( * ) Notice: Subject to any disclaimer, the term of this patent is extended or adjusted under 35 U.S.C. 154(b) by 102 days.

(21) Appl. No.: 14/890,111

(22) PCT Filed: Aug. 14, 2013

(86) PCT No.: PCT/EP2013/066992
§ 371 (c)(1),
(2) Date: Nov. 9, 2015

(87) PCT Pub. No.: WO2014/180513
PCT Pub. Date: Nov. 13, 2014

(65) Prior Publication Data
US 2016/0088487 A1    Mar. 24, 2016

(30) Foreign Application Priority Data

May 10, 2013  (WO) ................ PCT/EP2013/059711

(51) Int. Cl.
*H04W 4/00*    (2009.01)
*H04W 16/14*   (2009.01)
(Continued)

(52) U.S. Cl.
CPC ......... *H04W 16/14* (2013.01); *H04L 5/0096* (2013.01); *H04W 8/02* (2013.01); *H04W 24/02* (2013.01);
(Continued)

(58) Field of Classification Search
None
See application file for complete search history.

(56) References Cited

U.S. PATENT DOCUMENTS

| 5,412,658 A | 5/1995 | Arnold et al. |
| 7,876,701 B2 | 1/2011 | Li et al. |

(Continued)

FOREIGN PATENT DOCUMENTS

| WO | 2010/133239 A1 | 11/2010 |
| WO | 2011/020514 A1 | 2/2011 |

(Continued)

OTHER PUBLICATIONS

International Search Report and Written Opinion for International Application No. PCT/EP2013/066992, dated May 12, 2014, 13 pages.

(Continued)

*Primary Examiner* — Kibrom T Hailu
(74) *Attorney, Agent, or Firm* — Brake Hughes Bellermann LLP

(57) ABSTRACT

An apparatus including:
at least one processor, and
at least one memory for storing instructions to be executed by the processor, wherein
the at least one memory and the instructions are configured to, with the at least one processor, cause the apparatus to at least:
request for using a part of a spectrum of a second communication network on the basis of a spectrum cooperation relationship between a first communication network and the second communication network,
provide a service coordination information related to the request for using a part of the spectrum, the service (Continued)

coordination information indicating measures based on roaming mechanism offered by the first communication network allowing the second communication network to obtain compensation in the form of communication resources or traffic for using a part of the spectrum of the second communication network by the first communication network, and receive and process a response to the request for using a part of the spectrum of the second communication network and a service coordination response informing about accepted measures of those being offered in the service coordination information.

20 Claims, 10 Drawing Sheets

(51) Int. Cl.
| | |
|---|---|
| *H04L 5/00* | (2006.01) |
| *H04W 8/02* | (2009.01) |
| *H04W 24/02* | (2009.01) |
| *H04W 72/04* | (2009.01) |
| *H04W 28/08* | (2009.01) |
| *H04W 36/06* | (2009.01) |
| *H04W 92/20* | (2009.01) |
| *H04W 88/18* | (2009.01) |

(52) U.S. Cl.
CPC ......... *H04W 28/085* (2013.01); *H04W 36/06* (2013.01); *H04W 72/04* (2013.01); *H04W 88/182* (2013.01); *H04W 92/20* (2013.01)

(56) References Cited

U.S. PATENT DOCUMENTS

| | | | |
|---|---|---|---|
| 8,005,091 B2 | 8/2011 | Wu et al. | |
| 8,014,464 B2 | 9/2011 | Benjebbour et al. | |
| 8,134,931 B2 | 3/2012 | Laroia et al. | |
| 8,170,576 B2 | 5/2012 | Wu et al. | |
| 8,270,923 B2 | 9/2012 | Li et al. | |
| 8,290,503 B2 | 10/2012 | Sadek et al. | |
| 8,295,153 B2 | 10/2012 | Nentwig et al. | |
| 8,340,044 B2 | 12/2012 | Laroia et al. | |
| 8,570,972 B2 | 10/2013 | Laroia et al. | |
| 8,620,383 B2 | 12/2013 | Panchal et al. | |
| 8,654,719 B2 | 2/2014 | Hamalainen et al. | |
| 8,675,605 B2 | 3/2014 | Charbit et al. | |
| 9,107,232 B2 | 8/2015 | Krishnaswamy et al. | |
| 9,144,077 B2 | 9/2015 | Mueck et al. | |
| 9,185,566 B2 | 11/2015 | Prakash et al. | |
| 9,451,612 B2 | 9/2016 | Salem et al. | |
| 9,473,287 B2 | 10/2016 | Panchal et al. | |
| 2006/0154668 A1 | 7/2006 | Li et al. | |
| 2006/0205367 A1 | 9/2006 | Karabinis et al. | |
| 2010/0202305 A1* | 8/2010 | Wijting | H04W 16/14 370/252 |
| 2012/0120887 A1* | 5/2012 | Deaton | H04W 16/14 370/329 |
| 2013/0090124 A1* | 4/2013 | Panchal | H04W 24/02 455/452.1 |
| 2013/0095826 A1 | 4/2013 | Vrbaski et al. | |
| 2015/0296485 A1* | 10/2015 | Arefi | H04W 16/14 370/329 |
| 2016/0094999 A1 | 3/2016 | Yu et al. | |
| 2016/0112879 A1 | 4/2016 | Horneman et al. | |

FOREIGN PATENT DOCUMENTS

| | | |
|---|---|---|
| WO | 2014/180507 A1 | 11/2014 |
| WO | 2014/180514 A1 | 11/2014 |

OTHER PUBLICATIONS

Hugl, Klaus, "Meeting the Challenges for Future Wireless Communication Needs", Informationstechnisches Kolloqium, May 8, 2012, 18 pages, XP-002693254.

Hooli, Kari et al., "Winner Spectrum Aspects: Methods for efficient sharing, flexible spectrum use and coexistence", Information Society Technologies, D6.1 v1.0, Oct. 30, 2004, 88 pages.

IEEE / IEEE Std 802.11y™-2008, IEEE Standard for Information technology—Telecommunications and information exchange between systems—Local and metropolitan area networks—Specific requirements, Part 11: Wireless LAN Medium Access Control (MAC) and Physical Layer (PHY) Specifications, Amendment 3: 3650-3700 MHz Operation in USA.

Non Final Office Action for U.S. Appl. No. 14/890,108, dated Jan. 3, 2017, 44 pages.

\* cited by examiner

COMMUNICATION MECHANISM USING SPECTRUM SHARING

This application is a national stage entry of PCT/EP2013/066992, filed Aug. 14, 2013, entitled "COMMUNICATION MECHANISM USING SPECTRUM SHARING", which claims priority to PCT Application No. PCT/EP2013/059711, filed on May 10, 2013, entitled "COMMUNICATION MECHANISM USING A CO-PRIMARY SPECTRUM SHARING" which are hereby incorporated by reference in their entireties.

BACKGROUND

Field

The present invention relates to apparatuses, methods, systems, computer programs, computer program products and computer-readable media usable for controlling a communication in a communication network wherein spectrum sharing is employed.

Background Art

The following description of background art may include insights, discoveries, understandings or disclosures, or associations, together with disclosures not known to the relevant art prior, to at least some example versions of the disclosure or of some examples of embodiments of the present invention but provided by the invention. Some such contributions of the invention may be specifically pointed out below, whereas other such contributions of the invention will be apparent from their context.

The following meanings for the abbreviations used in this specification apply:
AP: access point
ASA: authorized shared access
BS: base station
CPU: central processing unit
CR: cognitive radio
E-UTRAN: evolved UMTS radio access network
eNB: evolved node B
FSU: flexible spectrum usage
GBR: guaranteed bit rate
ID: identification, identifier
ISCR individual spectrum cooperation relationship
LAI: location area identifier
LTE: Long Term Evolution
LTE-A: LTE Advanced
O&M: operation and maintenance
OPA, OPB: operator network A, operator network B
PDCCH: physical downlink control channel
PLMN: public land mobile network
PS: packet switched
PUCCH: physical uplink control channel
QoE: quality of experience
RACH: random access channel
RAN: radio access network
RF: radio frequency
RSRP: reference symbol received power
RSRQ: reference symbol received quality
SCR: spectrum cooperation relationship
SON: self organizing network
TAI: tracking area identifier
UE: user equipment
UMTS: universal mobile telecommunication system In the last years, an increasing extension of communication networks, e.g. of wire based communication networks, such as the Integrated Services Digital Network (ISDN), DSL, or wireless communication networks, such as the cdma2000 (code division multiple access) system, cellular 3rd generation (3G) and fourth generation (4G) communication networks like the Universal Mobile Telecommunications System (UMTS), enhanced communication networks based e.g. on LTE or LTE-A, cellular 2nd generation (2G) communication networks like the Global System for Mobile communications (GSM), the General Packet Radio System (GPRS), the Enhanced Data Rates for Global Evolution (EDGE), or other wireless communication system, such as the Wireless Local Area Network (WLAN), Bluetooth or Worldwide Interoperability for Microwave Access (WiMAX), took place all over the world. Various organizations, such as the 3rd Generation Partnership Project (3GPP), Telecoms & Internet converged Services & Protocols for Advanced Networks (TISPAN), the International Telecommunication Union (ITU), 3rd Generation Partnership Project 2 (3GPP2), Internet Engineering Task Force (IETF), the IEEE (Institute of Electrical and Electronics Engineers), the WiMAX Forum and the like are working on standards for telecommunication network and access environments.

Generally, for properly establishing and handling a communication connection between terminal devices such as a user device or user equipment (UE) and another communication network element or user device, a database, a server, host etc., one or more intermediate network elements such as communication network control elements, such as base stations, control nodes, support nodes or service nodes are involved which may belong to different communication network.

Basically, a communication network is typically divided into several cells controlled by a communication network control element like a BS or eNB, an O&M element and the like.

Besides a classical network environment where plural cells of the same type (e.g. plural macro cells) are arranged in a neighboring manner, new approaches are provided in order to enhance the performance of communication networks. One of these approaches is the implementation of a heterogeneous network structure. A heterogeneous network may comprise e.g. a "normal" communication cell (i.e. a macro cell) controlled by a communication network control element, such as an eNB in LTE or LTE-A networks, and plural small cells having also an own communication network control element or access network element (also referred to as an access point AP), which are referred to, for example, as local area or small cells controlled by a corresponding AP or the like. The term "small cell" is typically used to describe a low-powered radio access node or cell having a range of tens or some hundred meters. A heterogeneous network provides, for example, an improved coverage and the possibility for offloading from a communication in the macro cell to a small cell. The small cells are coupled, for example, to the communication network control element of the macro cell by a backhaul network offering high capacity, or the like.

A further approach for enhancing the performance of communication networks, flexible spectrum management and dynamic access schemes are under consideration. One example is the so-called co-primary spectrum sharing. Co-primary spectrum sharing refers to a spectrum access model where two or more primary license holders (of the same radio service) agree on a joint usage of parts of their licensed spectrum. For example, co-primary spectrum sharing may require a mutual agreement on exact usage conditions (policies etc.) between the license holders, and it may also be necessary that a national regulator has to check and permit the entire model.

As another example, it is also possible that a regulator allocates a part of a communication spectrum not exclusively to a single operator but jointly to several potential users (operators) with the obligation to use it collectively under fair conditions and subject to certain rules.

Basically, co-primary spectrum sharing will provide more dynamic spectrum sharing between operators providing the same radio services.

SUMMARY

According to an example version of the disclosure, there is provided, for example, an apparatus comprising at least one processor, and at least one memory for storing instructions to be executed by the processor, wherein the at least one memory and the instructions are configured to, with the at least one processor, cause the apparatus at least: to request for using a part of a spectrum of a second communication network on the basis of a spectrum cooperation relationship between a first communication network and the second communication network, to provide a service coordination information related to the request for using a part of the spectrum, the service coordination information indicating measures based on roaming mechanism offered by the first communication network allowing the second communication network to obtain compensation in the form of communication resources or traffic for using a part of the spectrum of the second communication network by the first communication network, and to receive and process a response to the request for using a part of the spectrum of the second communication network and a service coordination response informing about accepted measures of those being offered in the service coordination information.

Furthermore, according to an example version of the disclosure, there is provided, for example, an apparatus comprising a method comprising requesting for using a part of a spectrum of a second communication network on the basis of a spectrum cooperation relationship between a first communication network and the second communication network, providing a service coordination information related to the request for using a part of the spectrum, the service coordination information indicating measures based on roaming mechanism offered by the first communication network allowing the second communication network to obtain compensation in the form of communication resources or traffic for using a part of the spectrum of the second communication network by the first communication network, and receiving and processing a response to the request for using a part of the spectrum of the second communication network and a service coordination response informing about accepted measures of those being offered in the service coordination information.

According to a further example version of the disclosure, there is provided, for example, an apparatus comprising at least one processor, and at least one memory for storing instructions to be executed by the processor, wherein the at least one memory and the instructions are configured to, with the at least one processor, cause the apparatus at least: to receive and process a request for using a part of a spectrum of a second communication network by a first communication network on the basis of a spectrum cooperation relationship between the first communication network and the second communication network, to receive and process a service coordination information related to the request for using a part of the spectrum, the service coordination information indicating measures based on roaming mechanism offered by the first communication network allowing the second communication network to obtain compensation in the form of communication resources or traffic for using a part of the spectrum of the second communication network by the first communication network, to decide, on the basis of at least one of the request for using a part of the spectrum and the service coordination information, which part of the spectrum of the second communication network is granted to the request, to select, on the basis of the service coordination information, measures based on roaming mechanism to be accepted, and to cause to transmit a response to the request for using a part of the spectrum of the second communication network and a service coordination response informing about the accepted measures based on roaming mechanism.

In addition, according to an example version of the disclosure, there is provided, for example, a method comprising receiving and processing a request for using a part of a spectrum of a second communication network by a first communication network on the basis of the spectrum cooperation relationship between the first communication network and the second communication network, receiving and processing a service coordination information related to the request for using a part of the spectrum, the service coordination information indicating measures based on roaming mechanism offered by the first communication network allowing the second communication network to obtain compensation in the form of communication resources or traffic for using a part of the spectrum of the second communication network by the first communication network, deciding, on the basis of at least one of the request for using a part of the spectrum and the service coordination information, which part of the spectrum of the second communication network is granted to the request, selecting, on the basis of the service coordination information, measures based on roaming mechanism to be accepted, and causing to transmit a response to the request for using a part of the spectrum of the second communication network and a service coordination response informing about the accepted measures based on roaming mechanism.

Moreover, according to a further example version of the disclosure, there is provided, for example, an apparatus comprising at least one processor, and at least one memory for storing instructions to be executed by the processor, wherein the at least one memory and the instructions are configured to, with the at least one processor, cause the apparatus at least: to receive and process a switching instruction from a home communication network to switch a communication connection to a another communication network with which the home communication network has set up a spectrum cooperation relationship in which a spectrum used for communication by one of the communication networks is allowed to be shared by the other of the communication networks, to conduct a processing for switching the communication connection from the home communication network to the other communication network, and to use services of the other communication network instead of the home communication network after switching the communication connection.

Moreover, according to an example version of the disclosure, there is provided, for example, a method comprising receiving and processing a switching instruction from a home communication network to switch a communication connection to a another communication network with which the home communication network has set up a spectrum cooperation relationship in which a spectrum used for communication by one of the communication networks is allowed to be shared by the other of the communication networks, conducting a processing for switching the communication connection from the home communication network to the other communication network, and using services of the other communication network instead of the home communication network after switching the communication connection.

In addition, according to example versions of the disclosure, there is provided, for example, a computer program product for a computer, comprising software code portions for performing the steps of the above defined methods, when said product is run on the computer. The computer program product may comprise a computer-readable medium on which said software code portions are stored. Furthermore, the computer program product may be directly loadable into the internal memory of the computer and/or transmittable via a network by means of at least one of upload, download and push procedures.

BRIEF DESCRIPTION OF THE DRAWINGS

Some example versions of the disclosure are described below, by way of example only, with reference to the accompanying drawings, in which.

DESCRIPTION OF EXAMPLES

Figure 1:
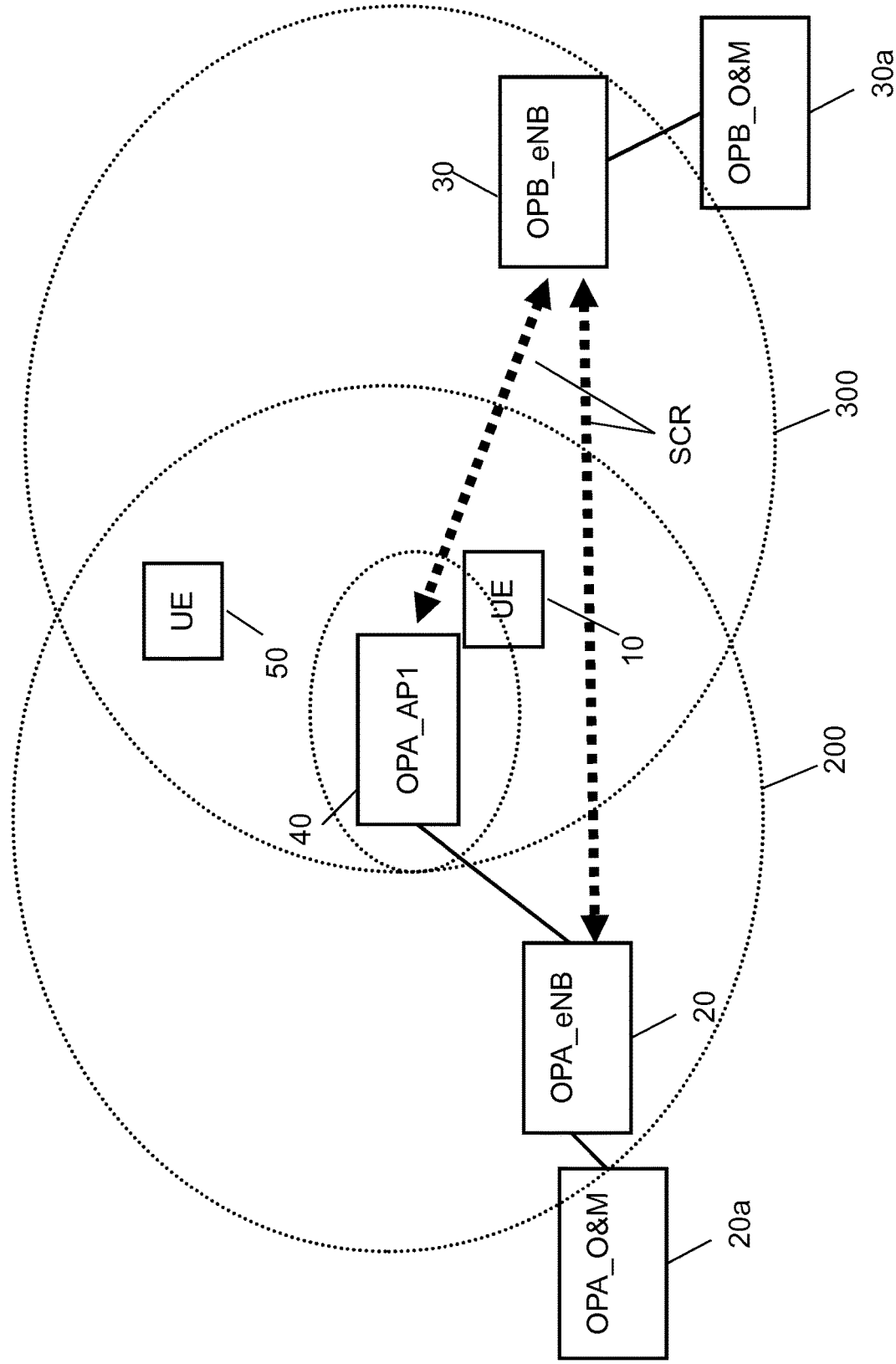
FIG. 1 shows a diagram illustrating a communication network configuration where some example versions of the disclosure are implemented.

In the following, some example versions of the disclosure are described with reference to the drawings wherein, as an example of a communication network, an LTE-Advanced based system is used. However, it is to be noted that the present invention is not limited to an application using such types of communication system, but is also applicable in other types of communication systems and the like.

The following example versions of the disclosure are only examples. Although the specification may refer to "an", "one", or "some" example versions of the disclosure in several locations, this does not necessarily mean that each such reference is to the example version of the disclosure, or that the feature only applies to a single example version of the disclosure. Single features of different example versions of the disclosure may also be combined to provide other example versions of the disclosure. Furthermore, words "comprising" and "including" should be understood as not limiting the described example versions of the disclosure to consist of only those features that have been mentioned and such example versions of the disclosure may also contain also features, structures, units, modules etc. that have not been specifically mentioned.

A basic system architecture of a communication system where example versions of the disclosure are applicable may comprise a commonly known architecture of one or more communication networks comprising a wired or wireless access network subsystem and a core network. Such an architecture may comprise one or more communication network control elements, access network elements, radio access network elements, access service network gateways or base transceiver stations, such as a base station, an access point or an eNB, which control a respective coverage area or cell (macro cell, small cell) and with which one or more communication elements or terminal devices such as a UE or another device having a similar function, such as a modem chipset, a chip, a module etc., which can also be part of a UE or attached as a separate element to a UE, or the like, are capable to communicate via one or more channels for transmitting several types of data. Furthermore, core network elements such as gateway network elements, policy and charging control network elements, mobility management entities, operation and maintenance elements, and the like may be comprised.

The general functions and interconnections of the described elements, which also depend on the actual network type, are known to those skilled in the art and described in corresponding specifications, so that a detailed description thereof is omitted herein. However, it is to be noted that several additional network elements and signaling links may be employed for a communication to or from an access network element like an AP and a communication network besides those described in detail herein below.

The communication networks are also able to communicate with other networks, such as a public switched telephone network or the Internet. The communication network may also be able to support the usage of cloud services. It should be appreciated that APs and/or eNBs or their functionalities may be implemented by using any node, host, server or access node etc. entity suitable for such a usage.

Furthermore, the described network elements, such as terminal devices or user devices like UEs, communication network control elements of a cell, like an eNB, an O&M element, access network elements like APs and the like, as well as corresponding functions as described herein may be implemented by software, e.g. by a computer program product for a computer, and/or by hardware. In any case, for executing their respective functions, correspondingly used devices, nodes or network elements may comprise several means, modules, units, components, etc. (not shown) which are required for control, processing and/or communication/signaling functionality. Such means, modules, units and components may comprise, for example, one or more processors or processor units including one or more processing portions for executing instructions and/or programs and/or for processing data, storage or memory units or means for storing instructions, programs and/or data, for serving as a work area of the processor or processing portion and the like (e.g. ROM, RAM, EEPROM, and the like), input or interface means for inputting data and instructions by software (e.g. floppy disc, CD-ROM, EEPROM, and the like), a user interface for providing monitor and manipulation possibilities to a user (e.g. a screen, a keyboard and the like), other interface or means for establishing links and/or connections under the control of the processor unit or portion (e.g. wired and wireless interface means, radio interface means comprising e.g. an antenna unit or the like, means for forming a radio communication part etc.) and the like, wherein respective means forming an interface, such as a radio communication part, can be also located on a remote site (e.g. a radio head or a radio station etc.). It is to be noted that in the present specification processing portions should not be only considered to represent physical portions of one or more processors, but may also be considered as a logical division of the referred processing tasks performed by one or more processors.

According to some example versions of the disclosure, a communication mechanism related to wireless communication systems, such as 3GPP LTE-A systems, is provided which includes intelligent spectrum management aspects, such as cognitive radio (CR) aspects, wherein a spectrum sharing mechanism such as co-primary spectrum sharing for providing a flexible spectrum management and dynamic access schemes is used.

Cognitive radio aspects relate, for example, to a communication control scheme where available channels in a wireless communication spectrum (e.g. RF spectrum) are detected, the best available wireless channels in the vicinity of a corresponding communicating network element (such as an AP or the like) are selected and then transmission and reception parameters are changed accordingly to use the selected channels. This makes it possible to enhance the overall performance in the communication network by utilizing available resources in a given spectrum at a certain location.

When combining a co-primary sharing access mode and cognitive radio access procedures, higher peak data rates for end users as well as higher capacity and wider coverage are achievable.

However, when spectrum sharing is implemented, the communication network from which a part of the spectrum is requested (i.e. where usage rights of the spectrum in question are temporally transferred from one communication network to another communication network) looses for a certain time some of its capacity, and this capacity may be re-gained only with a certain effort (e.g. when signaling between the networks is required etc.). That is, under certain circumstances, spectrum sharing is not advantageous for all parties involved therein. Hence, in order to ensure that all networks operators have benefits from the spectrum sharing participation, a certain level of fairness between operators has to be ensured when using shared spectrum, in particular in scenarios where a flexible spectrum usage is implemented in a multiple operator scenario. According to some example versions of the disclosure, mechanisms for service coordination are proposed which support spectrum sharing by providing solutions for making a network operator be willing to share a part of the spectrum and in which way measures for compensating for a spectrum usage by another network can be communicated and processed. Specifically, according to example versions of the disclosure, measures based on roaming mechanism are used for offering a compensation in the form of communication resources (i.e. resources of the first communication network are offered to be used by the second communication network) or traffic (i.e. traffic being originally generated in the first communication network is offered to be switched to the second communication network allowing a compensation by providing and thus charging services to selected users).

By virtue of some example versions of the disclosure, it is possible to provide an enhanced mechanism implementable in a spectrum sharing system which allows avoiding that the spectrum sharing is excessively used by single operators.

Furthermore, it is possible that network operators (which will be referred to hereinafter as OPA and OPB, wherein the number of operators is not necessarily limited to two) are able to utilize example versions of the disclosure to further optimize the performance of the own network when participating in the spectrum sharing as it is possible, in a flexible manner, to adapt measures based on roaming mechanism offered or selected for compensation in the form of resources or traffic for the grant of a part of the spectrum in view of local communication situations, for example by value controlling overhead, overload, capacity requirements, spectrum resources and charging possibilities at the same time.

With regard to FIG. 1, a diagram illustrating a general configuration of a communication network where some example versions of the disclosure invention are implemented is shown. It is to be noted that the configuration shown in FIG. 1 shows only those devices, network elements and/or parts which are useful for understanding principles underlying the example versions of the disclosure. As also known by those skilled in the art there may be several other network elements or devices involved in a communication network which are omitted here for the sake of simplicity.

The network configuration according to FIG. 1 is for example based on the 3GPP specifications and comprises elements of a heterogeneous network including one or more wide area cells (macro cell) and one or more local area cells (small cells), and elements of parallel (neighboring) macro cells and small cells. It is to be noted that the general functions of the elements described in connection with FIG. 1 as well as of reference points/interfaces between the elements are known to those skilled in the art so that a detailed description thereof is omitted here for the sake of simplicity.

The term "neighboring cell" is to be understood in such a manner that the respective cells have at least partly overlapping coverage areas for their radio connections towards a communication element (i.e. a UE) so that it is possible that an communication element or the access network element can communicate with the neighboring cell via a radio connection. In other words, neighboring cells are those cells which represent candidates for a handover to and from each other, wherein of course more than two cells can be neighboring cells to each other, depending on the current network architecture, communication conditions, etc. The switching of a communication connection from one network to another network is referred to as roaming, wherein cells of the respective communication networks may be also neighboring cells.

As shown in FIG. 1, in the exemplary communication network system, two neighboring macro cells 200 and 300 are provided. Cells 200 and 300 are respective part of a communication network of a first operator (OPA) and a second operator (OPB), respectively, wherein each operator's exclusive (RF) spectrum is used in each cell.

Each of the macro cells 200, 300 is controlled by a corresponding communication network control element comprising, e.g. a (macro) eNB (OPA_eNB 20 of operator network OPA) and an O&M element (OPA_O&M 20a) of the first operator network OPA, or a (macro) eNB (OPB_eNB 30 of operator network OPB) and an O&M element (OPB_O&M 30a) of the second operator network OPB.

As shown in FIG. 1, the OPA network comprises one or more small cells (only one is shown in FIG. 1) in a heterogeneous network structure, which is connected to a communication network control element of the macro cell 200. It is to be noted that also the OPB network may comprise one or more small cells. Specifically, to the macro cell 200 (i.e. the OPA_eNB 20), a small cell controlled by a respective access network element or AP, i.e. OPA_AP1 40 is linked.

It is to be noted that according to some example versions of the disclosure, the small cell of a respective operator network, such as OPA_AP1 40, may be under control of the macro cell to which they are connected (i.e. controlled by the OPA_eNB 20, for example). That is, the macro cell communication network control element is configured to execute several control procedures for the respective small cell AP, such as control, allocation and/or coordination of a flexible spectrum usage of the small cells (the small cell APs, such as OPA_AP1 40).

According to example versions of the disclosure, the APs of the respective small cells and the communication network control element of the respective operator are connected by interfaces using a backhaul network or another connection type, such as a wired or wireless communication line, or the like.

Furthermore, as indicated in FIG. 1, communication elements or devices (UE 10, UE 50) are located in the cell areas. Specifically, it is assumed that the home communication network of the UE 10 is OPA, wherein a connection to OPA_eNB 20 or OPA_AP1 is assumed to be established, while UE 50 is assumed to have OPB as the home communication network and to have established a connection to OPB_eNB 30.

It should be appreciated that according to some example versions of the disclosure, a so-called "liquid" or flexible radio concept is employed where the operations and functionalities of a communication network control element or of another entity of the communication network, such as of one or more of the shown eNBs or APs, may be performed in different entities, such as a node, host or server, in a flexible manner. In other words, a "division of labour" between involved network elements or entities may vary case by case. One possible alternative to the example illustrated is, for example, to make a base station or the like to deliver local content.

It is to be noted that even though FIG. 1 shows two macro cells 200 and 300, the number of cells is not limited thereto and can be more than two, wherein at least respective two cells are neighboring cells.

In the example shown in FIG. 1, it is now assumed that a spectrum sharing agreement between multiple (here two) operator networks has been negotiated allowing spectrum cooperation relationship (SCR) to be established between e.g. OPA and OPB on different levels, e.g. between the macro cells (represented by a dashed arrow between OPA_eNB 20 and OPB_eNB 30), between small cells and macro cells (represented by a dashed arrow between OPA_AP1 40 and OPB_eNB 30). By means of the SCR, the spectrum sharing between the two operator networks is facilitated. Rules being negotiated between the operator networks concern, for example, rules defining details of the spectrum sharing, such as which part of the shared spectrum one operator network (such as OPB network) may use with higher priority than the other operator network (such as OBA network). The agreement defines, for example, what and at which time spectrum parts can be requested or granted, how long a spectrum part may be granted etc. Corresponding parameters may be stored in the operator networks, e.g. in corresponding communication network control elements, and used when a spectrum sharing is requested (i.e. the corresponding elements are correspondingly configured).

During the spectrum sharing, it is assumed in the following that one operator network (e.g. OPB network) may grant a usage right for its spectrum to the other operator network (OPA network) for its cells.

According to some examples versions of the disclosure, the service coordination allowing to implement measures for compensating in the form of communication resources or traffic for the grant of spectrum usage rights is based on roaming service. Roaming service is widely applied in mobile cellular communication networks for switching communication connections of users (UEs) between the networks of the different operators for providing service to the UEs. That is, by coordinating the switching of the communication connection of UEs from one operator network to another operator network, and hence allowing that the UE is served then by the other network, an incentive method can be established so that the sharing/granting of some spectrum part with/to the other operator network is compensated for. The compensation is achieved, for example, by an overload reduction in some cells or some areas of the spectrum granting network so that e.g. a QoE of remaining users is improved, or by overhead reduction of idle mode users. Alternatively, compensation is achieved by charging UEs of the other network which have conducted a roaming as compensation for granting the spectrum usage right to the other network.

A service coordination negotiation and agreement may be made between the operator networks in parallel to the negotiation for the spectrum sharing agreement. The service coordination negotiation and agreement results in a spectrum sharing incentive agreement between the networks, e.g. OPB and OPA.

The result of the service coordination negotiation and agreement (i.e. of the spectrum sharing incentive agreement) is the provision of principles or rules in which way a grant of spectrum sharing is to be compensated. For example, it is agreed which balance between spectrum request and compensation measure is to be considered. Specifically, it is defined, for example, which measures based on roaming mechanism are to be offered for a spectrum request, e.g. ranges of a capacity/resource commitment by the requesting network versus the amount of spectrum requested/granted, procedures for traffic switching from the requesting network to the granting network, communication properties of UEs selected for traffic switching, etc. In this context, according to some example versions of the disclosure, also rules regarding a charging of UEs being switched (roaming) from one network to the other network as a result of the spectrum grant compensation measure based on roaming mechanisms are agreed to (e.g. whether a UE is charged by the home network operator or by the visited network operator, whether an extra compensation measure is provided by the home network operator (i.e. the spectrum requesting operator) if an expected amount of charging is not achieved from roaming UE by the spectrum granting operator, etc.). Also rules regarding a situation where an overuse of capacity/resource commitment happens are agreed (for example, whether the visited operator is allowed to reject services for a roaming UE or has to accept such services but with an additional compensation).

It is to be noted that the above discussed rules are only examples for parameters of the spectrum sharing incentive agreement, and other rules can be agreed to in addition or alternatively.

Figure 2:
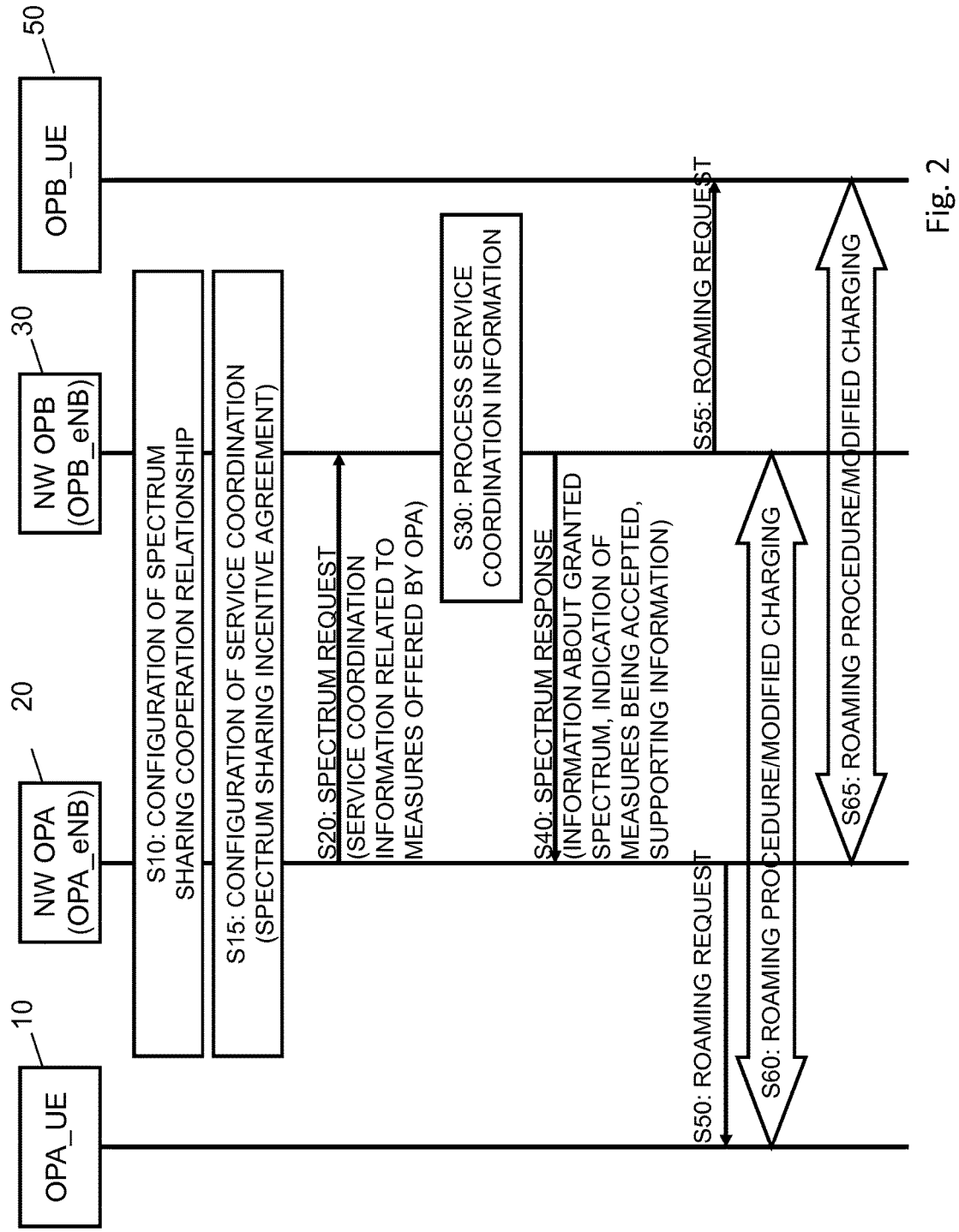
FIG. 2 shows a signaling diagram illustrating controlling of a communication using a spectrum sharing based on a spectrum cooperation relationship with service coordination according to some example versions of the disclosure.

FIG. 2 shows a signaling diagram illustrating controlling of a communication using a spectrum sharing based on a spectrum cooperation relationship with service coordination according to some example versions of the disclosure. Specifically, the example of FIG. 2 is related to mechanisms implementing a service coordination between the communication networks of OPA and OPB wherein a spectrum usage of the OPB's high-priority spectrum by the OPA network (e.g. by OPA_eNB 20 or OPA_AP1 40) is requested and granted.

In S10, network elements involved in a spectrum cooperation relationship are configured in accordance with the result of a spectrum sharing cooperation negotiation between the operators (i.e. OPA and OPB). That is, communication network control elements are configured to establish an SCR link, when suitable (e.g. when measurement results are thus that an SCR link can be established between e.g. a small cell AP of one network and the macro cell eNB of the other network), resulting in a SCR opportunity or link as indicated e.g. in FIG. 1.

In addition, a function enabling a service coordination is configured in the communication network control elements involved in the communication procedure according to example versions of the disclosure. That is, in S15, a configuration based on a spectrum sharing incentive agreement (which is negotiated between the networks (e.g. OPB and OPA)) is executed (for example, settings for balancing between spectrum request and compensation measure is configured, etc.).

By means of this, according to some example versions of the disclosure, a spectrum requesting communication network control element (such as a small cell AP) is configured to select measures based on roaming mechanism to be offered for compensating for a spectrum request, for example.

In S20, one of the networks, e.g. OPA network, decides that it requires additional spectrum and that it launches for this purpose a spectrum request toward OPB. For example, it is assumed that OPA_eNB 20 uses the SCR link towards OPB_eNB 30 for such a spectrum request. Furthermore, when the decision is made to request for the spectrum usage right of a part of the OPB spectrum, the rules according to the spectrum sharing incentive agreement are considered in order to determine measures to be taken by the OPA network and offered to the OPB network for compensation purpose. In this determination, it is considered, for example, which amount of spectrum is requested, how the load situation in the own network is (for example, when a switch of a UE of OPA is offered, preferably a UE in an area having a high load is selected, or when a switch of a UE of OPB to OPA is offered, an area with low load is preferably selected). When the measures to be offered are determined in the OPA network, corresponding information (referred to as service coordination information) is prepared which is usable for indicating the offered measures to the OPB network. For example, according to some example versions of the disclosure, the service coordination information is provided to the OPB with the spectrum request message in S20.

For example, when OPA offers as the compensation measure communication resources, e.g. to serve for UEs of OPB (i.e. UEs of OPB are allowed to roam to OPA network), the service coordination information include information parts related to the capacity/resource commitment (e.g. in the form of GBR and/or a number of active UEs for best effort services and/or a number of idle UEs camping in OPA cells) of OPA to serve the UEs of OPB. Furthermore, the service coordination information may comprise information indicating an allowed service area of the OPA network for serving OPB UEs, e.g. in the form of either a forbidden zone or a permission zone, for example by geo-location information, LAIs/TAIs, etc.

On the other hand, when OPA offers as the compensation measure traffic, i.e. to switch one or more of its own users (UEs) to the OPB network for being served there, the OPA preselects one or more of its users (e.g. UE 10) as candidates for being roamed to the OPB network so that as a compensation of the requested spectrum from OPB these UEs can be served (and correspondingly charged) by the OPB network (i.e. that the pre-selected UEs may have higher probability to use the network services rather than only stay in idle mode). As a possible pre-selection criterion, OPA uses statistics or the like to determine such users which are expected to give a certain amount of traffic for OPB on which OPB may charge the users to increase the revenue. In the service coordination information, the OPA may include an identification of the pre-selected users, information regarding the expected revenue (e.g. in form of a statistic of the activity of the preselected UEs), which can be used by the OPB when deciding on granting of the spectrum to the OPA.

It is to be noted that the determination of the measures offered by the OPA for compensation may consider several criteria in parallel so as to optimize the performance of the own network in a flexible manner. Besides the consideration of the amount of requested spectrum, for example, the OPA may adapt the offered measures for compensation for the grant of a part of the spectrum of OPB in view of local communication situations (for example for controlling overhead, overload, capacity requirements, spectrum resources and charging possibilities). That is, statistics or real-time cell load of the OPA network can be used to select those measures which do not only fulfill the requirements of the spectrum sharing incentive agreement but also serves to improve the performance of the OPA network. For example, if OPA only requests the spectrum from OPB for a short time period, the real-time cell load may be used by the OPA network to determine a suitable area of the OPA network as an allowed service area. Thus, an area with high traffic load can be excluded from providing services for OPB UEs.

In S30, the OPB receives and processes the spectrum grant request and the service coordination information.

The decision regarding the granting of the spectrum to the OPA is based, for example, on a current traffic situation in the OPB network (i.e. is the requested spectrum available) etc. and considers the requested amount of spectrum as indicated in the request. On the other hand, based on the service coordination information, OPB selects one or more of the offered measures for compensation. According to some example versions of the disclosure, the selection of offered measures is also considered in the granting procedure, for example when some of the offered measures are not suitable so that the balance between offered measures for compensation and requested amount of spectrum is not in accordance with the spectrum sharing incentive agreement.

In S30, for example, when OPA offers as the compensation measure to serve for UEs of OPB (i.e. UEs of OPB are allowed to roam to OPA network), the OPB may select some of idle UEs (e.g. UE 50) to camp on cells of OPA. The selection may consider, for example, information provided by OPA with regard to capacity/resource commitment, an allowed service area indicated by OPA in the service coordination information and as well the cell/traffic load of the own network in the indicated area. The selection of UEs to be roamed by the OPB may also consider UE individual information, such as a mobility status, a prediction on activation of certain services etc., if available.

Furthermore, when the OPB selects own UEs to roam to OPA network, according to some example versions of the disclosure, the OPB takes into account agreed rules on overuse of committed capacity/resource. For instance, if it is agreed to reject the UE's service by OPA when a committed capacity/resource has been fully used, the OPB may avoid to select high priority UEs or may adapt the selected number of idle UEs to be roamed to the OPA network so that the committed capacity/resource is not to be overused with high probability.

Otherwise, when OPA offers as the compensation measure to switch one or more of its own users (UEs) to the OPB network (i.e. for being charged there), the OPB may check whether the expected charging amount is acceptable. Furthermore, in case the service coordination information provide information regarding the pre-selected UEs of OPA, it can be checked whether a service provision of these UEs is suitable for the OPB network, e.g. on the basis of a check of a load situation in areas where the pre-selected UEs of OPA would reside.

Hence, similar to the determination of measures to be offered by the OPA, the OPB is configured to select and accept measures for compensation by considering several criteria in parallel so as to optimize the performance of the own network in a flexible manner. Besides the consideration of the balance between accepted measures for compensation and the amount of granted spectrum, for example, the OPB may adapt the selection of offered measures for compensation for the grant of a part of the spectrum of OPB in view of local communication situations (for example for controlling overhead, overload, capacity requirements, spectrum resources and charging possibilities).

In S40, as a result of the decision of granting a part of the spectrum and the selection of measures to be accepted from the offer of the OPA, the OPB network sends back a spectrum response message including, besides an indication of the granted spectrum, information regarding the measures being accepted. In addition, supporting information can be included, if suitable, for example an identification of those UEs of OPB which are selected to be roamed to OPA, or information regarding an allowed service area (cells) of the OPB network which is allowed for UEs of OPA to be connected to. For example, the OPB provides information of selected UEs (e.g. a selected UE list) to OPA so that OPA learns which UEs (e.g. UE 50) are to be served and charged accordingly (for instance, OPA does not request a roaming charge from OPB for those UEs if committed capacity/resource is not overused).

Assuming that one of the accepted measures for compensation is to roam one or more (idle) UEs of OPB (e.g. UE 50) to the OPA network, S55 and S65 are executed.

In S55, OPB instructs the selected idle UEs (e.g. UE 50) to roam to the OPA network, i.e. to camp on cells of OPA. According to some example versions of the disclosure, this instruction may be given by means of a Roaming Request message. When the UE 50 is in an idle state, S50 is executed e.g. when the idle UE 50 makes a location update, or by paging the selected idle UE 50. According to some example versions of the disclosure, the instruction (e.g. the roaming request message) is provided by a standalone message. Alternatively, the instruction in S55 is embedded into another signaling, such as a location update or paging procedure signaling. Furthermore, the instruction may include information supporting the roaming procedure to the OPA network, for example in the form of prioritized PLMN ID, information on allowed/barred service area of OPA (e.g. corresponding LAIs/TAIs of OPA). Furthermore, according to some example versions of the disclosure, timer values can be provided to the UE 50 which indicates a time period during which the UE is determined to stay in OPA network (corresponding, for example, to a timer value indicating a time period during which the spectrum is granted to OPA).

In S65, the selected UE of OPB (i.e. UE 50) conducts, on the basis of the instruction of home network operator OPB, the roaming procedure towards the OPA network. That is, UE 50 selects possible cells of OPA to camp on (instead of the cells of its home network) and uses the OPA network for mobile services (e.g. making or receiving voice calls, sending or receiving PS data services and access other services). According to some example versions of the disclosure, if a corresponding agreement is made, UE 50 is charged by OPA in the same way as if it is still connected to the home network OPB (i.e. different to a normal roaming user).

On the other hand, assuming that one of the accepted measures for compensation is to switch one or more preselected UEs of OPA (e.g. UE 10) to the OPB network, S50 and S60 are executed.

In S50, after receiving the information from OPB regarding the accepted measures, i.e. regarding which UEs are accepted to be roamed to OPB and/or where in the OPB network the UEs can be switched (roamed), the OPA instructs the selected UEs (e.g. UE 10) to roam to the OPB network, i.e. to camp on cells of OPB. According to some example versions of the disclosure, this instruction may be given by means of a Roaming Request message. Furthermore, the instruction may include information supporting the roaming procedure to the OPB network, for example in the form of prioritized PLMN ID, information on allowed/barred service area of OPB (e.g. corresponding LAIs/TAIs of OPB). Furthermore, according to some example versions of the disclosure, timer values can be provided to the UE 10 which indicates a time period during which the UE is determined to stay in OPB network (corresponding, for example, to a timer value indicating a time period during which the spectrum is granted to OPA).

In S60, the selected UE of OPA (i.e. UE 10) conducts, on the basis of the instruction of home network operator OPA, the roaming procedure towards the OPB network. That is, UE 10 selects possible cells of OPB to camp on (instead of the cells of its home network) and uses the OPB network for mobile services (e.g. making or receiving voice calls, sending or receiving PS data services and access other services). According to some example versions of the disclosure, if a corresponding agreement is made, UE 10 is charged by OPB in the same way as if it is still connected to the home network OPA (i.e. different to a normal roaming user).

As indicated above, upon receiving a corresponding instruction from the home network (e.g. a roaming request message), the UE in question (UE 10, UE 50) starts searching and camp on the other operator's cell and uses the network for its services so as to start the measure for compensation for the usage of the spectrum. According to some example versions of the disclosure, the instruction from the home network comprises an indication that the roaming is caused by a service coordination process. This indication can be interpreted, for example, in such a manner that the charging for the usage of services is not increased compared to the home network, i.e. that there is no direct disadvantage for the user. This allows, for example, to avoid problems with the roaming procedure, e.g. in case the user has concerns regarding charging due to (undesired) roaming. According to further example versions, this indication is also usable for overriding e.g. a data roaming setting in the UE so as to avoid an unnecessary inhibition of services on the UE side (e.g. for making the service coordination transparent to the user).

According to some example versions of the disclosure, this measure can be ended either by the roamed UE or by the visited network. For example, based on a determination whether the allowed service area is leaved, or at an expiry of a timer, the roamed UE decides to go back to home operator network automatically. Alternatively, the roamed UE goes back to the home operator network upon receiving a further roaming request message from visited operator network, which is given by the visited network, for example, when the granted spectrum usage is terminated for any reason.

According to some example versions of the disclosure, a shared spectrum usage is beneficial and appropriate for small cell deployments (heterogeneous network scenario), for example since small cells may be more isolated than larger macro cells. According to some example versions of the disclosure, a system scenario is discussed where a wide area with exclusive spectrum for each operator is provided, while small cells of multiple operators being controlled by a respective macro cell can share the common spectrum pool in co-primary way.

According to some example versions of the disclosure, the spectrum usage is controlled in fast and dynamic way between multiple operators. That is, according to some example versions of the disclosure, coordination of the co-primary spectrum usage (within a certain local area) among small cells of multiple operators is provided. Hence, it is possible to avoid or at least minimize mutual interferences among the small cells using the shared spectrum.

Figure 3:
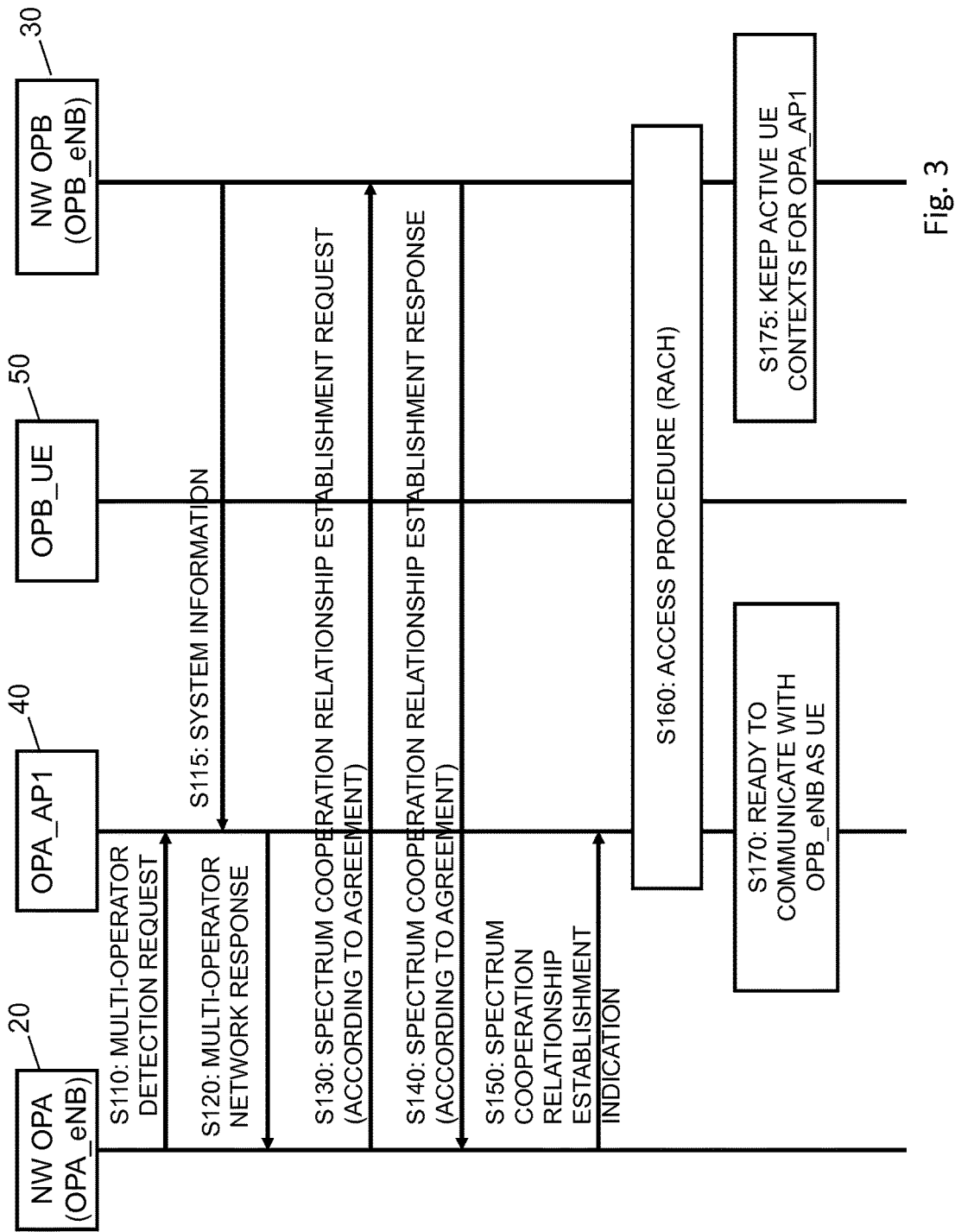
FIGS. 3 and 4 show signaling diagrams illustrating controlling of a communication using a spectrum sharing based on a spectrum cooperation relationship with service coordination according to some example versions of the disclosure.
Figure 4:
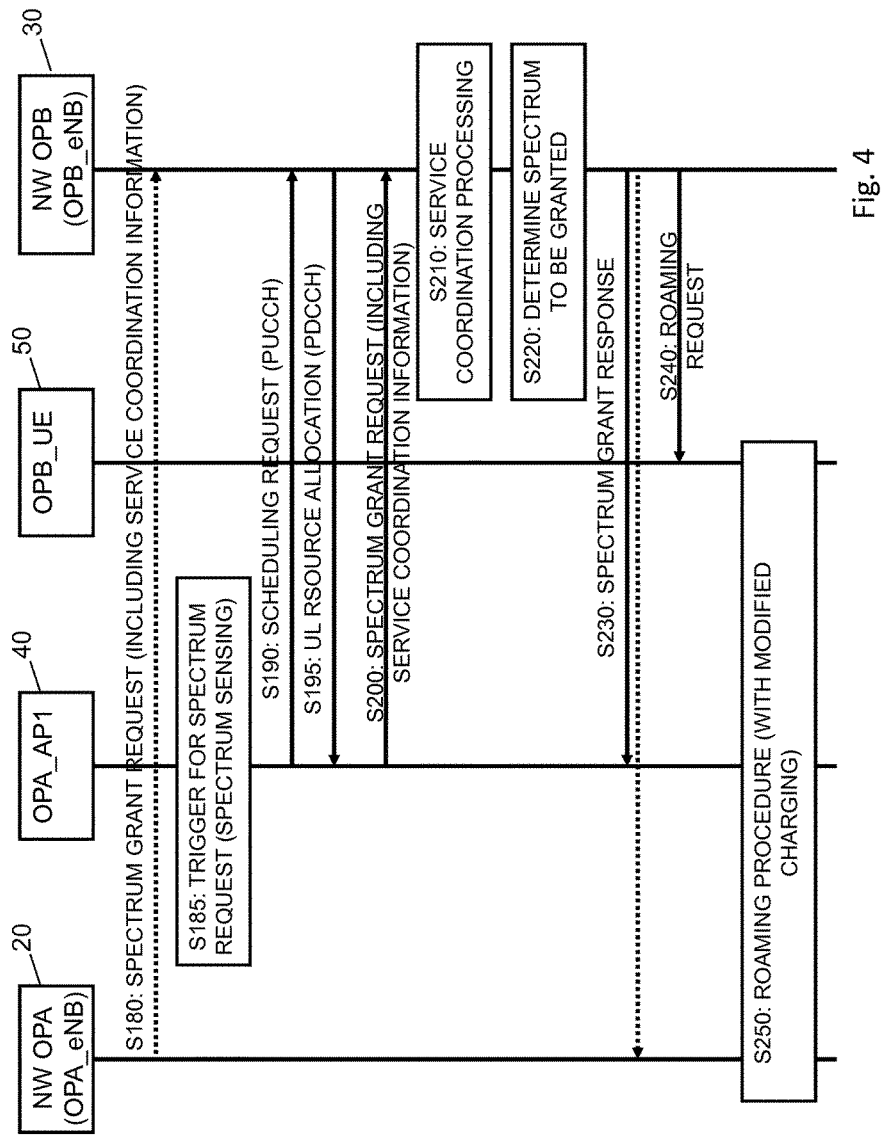

Next, with regard to FIGS. 3 and 4, signaling diagrams are shown which illustrate controlling of a communication using a spectrum sharing based on a spectrum cooperation relationship with service coordination according to some further example versions of the disclosure. Specifically, with regard to FIGS. 3 and 4, a situation is explained where a small cell such as that of OPA_AP1 40 is involved in the spectrum sharing scenario.

Specifically, an example is discussed where the small cell of OPA_AP1 is allowed to use a part of the spectrum of OPB and establishes an SCR link with the OPB network. That is, the OPB communication network control element (e.g. OPB_eNB 30 or OPB_O&M 30a) controls the spectrum usage of the small cell and grants a usage right for a part of the high-priority spectrum chunk to the OPA_AP1 40. This is indicated in FIG. 1 by a dashed arrow indicating a SCR between the networks of OPA and OPB with regard to the access network element OPA_AP1 40.

In FIG. 3, a signalling diagram is shown which illustrates a communication control using a spectrum sharing based on a spectrum cooperation relationship according to some example versions of the disclosure. Specifically, the example of FIG. 3 is related to an establishment of an SCR link based on a spectrum sharing agreement between the communication networks of OPA and OPB wherein a spectrum usage is requested by a small cell (e.g. of OPA_AP1 40) and granted, wherein the service coordination based on the spectrum sharing incentive agreement is executed.

According to example versions of the disclosure, the spectrum is shared among the multiple operators also for local area small cells. In FIG. 3, examples for setting up the SCR between a small cell AP of one operator (here of OPA_AP1 40) and the other operator network (here OPB) are illustrated. When the SCR link is established, the small cell AP can communicate with the other network (i.e. a serving cell of OPB, such as OPB_eNB 30) e.g. as an active communication element, i.e. as an active UE, for spectrum usage coordination.

In order to set up an SCR link based on the spectrum sharing agreement between the OPA and OPB network, the small cell AP (OPA_AP1 40) executes a detection of the other network, i.e. of OPB network, preferably of the macro network or cell 300 of OPB. For this purpose, for example, system information provided by the OPB network (in form of broadcasting messages) in S115 are detected and processed, for example.

The detection may be started by the OPA_AP1 40 itself, e.g. as a SON feature, or a request to start a multi-operator detection is sent from the OPA network (e.g. the OPA_eNB 20 or the OPA_O&M 20a) in S110.

According to some examples, in order to facilitate the detection conducted by the small cell OPA_AP1 40, the OPA_AP1 40 may be (pre-)configured with OPB's network related information, such as RF channels and PLMN identifiers thereof. This configuration information is provided e.g. by the request message in S110 or by a separate signaling (not shown). Based on the information, the OPA_AP1 40 then searches the OPB's network.

When the detection or a phase thereof is finished, in S120, OPA_AP1 40 reports the detection result of OPB's network to the OPA network (e.g. the OPA_eNB 20 or the OPA_O&M 20a), for example as a response to the message in S110 or as a separate message. The report comprises, for example, cell identifiers, downlink measurements (e.g. RSRP and/or RSRQ) etc. with regard to the OPB network. Furthermore, for example, in case more than one cell (macro cells and/or small cells) from the multiple operators' network (OPB network) are detected, the OPA_AP1 40 may relate the report sent in S120 to the strongest cell from each operator's network, or to all the detected cells from all the relevant operators.

Based on the detection report from OPA_AP1 40 in S120, the OPA network (e.g. the controlling OPA_eNB 20 of the OPA_AP1 40 or the OPA_O&M element 20a) initiates a setup or an establishment of a sharing spectrum cooperation relationship link with OPB network. For this purpose, in S130, a spectrum cooperation relationship establishment request is sent to a selected operator (e.g. OPB) network, e.g. to a communication network control element like OPB_eNB 30 indicated in the report. For example, the spectrum cooperation relationship establishment request may include information on IDs of detected OPB's cell(s) (macro/small cells), and information of the small cell AP for which the spectrum usage may be requested (i.e. OPA_AP1 40) as well as a capability information indicating the capability of the OPA_AP1 40 to act as an UE entity.

It is to be noted that the spectrum cooperation relationship establishment request can be sent in S130 to the selected operator (e.g. OPB) network by different communication paths. For example, a direct communication path, a communication path directed via core network elements, a communication path via the Internet, etc., may be used for conveying the respective message to the target operator network.

Moreover, it is to be noted that the OPA network may conduct a selection procedure for determining a target operator or cell for the establishment of the spectrum cooperation relationship. This selection procedure may be based on an algorithm and can consider e.g. current detection results, history data, pre-selection parameters etc.

Upon receiving the SCR establishment request in S130, the OPB network (e.g. OPB_eNB 30 or OPB_O&M 30a) may determine a macro cell of the OPB network which shall serve to the small cell AP (OPA_AP1 40) for requesting a spectrum usage right (for example on the basis of a selection procedure conducted in the OPB_eMN 30 or OPB_O&M 30a, or by using a (pre-) selection indication from OPA network). Furthermore, relevant UE contexts information may be determined enabling an access to the determined serving cell as a UE (for example, a C-RNTI, scheduling request configuration, signaling radio bearer configuration, DRX configuration, security configuration etc.).

In S140, in reply to the message in S130, the OPB network, e.g. OPB_eNB 30, sends an SCR establishment response to the OPA network (e.g. OPA_eNB 20). The spectrum cooperation relationship establishment response comprises e.g. an ID of the determined serving cell of OPB for the small cell AP of OPA, information about the primary spectrum of OPB, and the determined UE context information.

As in case of S130, also in S140 the spectrum cooperation relationship establishment response can be sent to the requesting operator (e.g. OPA) network by the same communication paths, for example, via a direct communication path, a communication path directed via core network elements, a communication path via the Internet, etc.

After receiving the spectrum cooperation relationship establishment response and the spectrum sharing incentive agreement in S140, the communication network control element of OPA (e.g. OPA_eNB 20 or OPA_O&M 20a)) provides in S150 the relevant information to the small cell AP (OPA_AP1 40) as control information indicating the establishment of the spectrum cooperation relationship.

In S160, based on the control information, the OPA_AP1 40 executes an access procedure to the serving cell identified in the control information by using the UE context information. That is, in S160, the OPA_AP1 40 and the serving cell of OPB (e.g. OPB_eNB 30) executes an access procedure wherein the OPA_AP1 40 acts like a UE trying to connect to the serving cell of OPB. For example, a RACH procedure using the indicated UE context information is executed. By means of this access procedure, the spectrum cooperation relationship link establishment is confirmed. Furthermore, the OPA_AP1 40 learns required timing advance information towards to the indicated serving cell.

As a result of the access procedure in S160, in S170, a communication connection path is established and the OPA_AP1 40 is ready to communicate with the serving cell (OPB_eNB 30) of the OPB network for requesting a grant of a spectrum usage, e.g. in the way as an RRC connected state UE of OPB. On the other hand, in S175, the serving cell (OPB_eNB 30) keeps active UE contexts for the OPA_AP1 40. That is, an air interface representing a spectrum cooperation communication opportunity is provided.

It is to be noted that a spectrum cooperation opportunity may be provided also in another manner. For example, a spectrum cooperation relationship may be programmed by an operator with measurements or a detection for the other communication network (OPB network) which is conducted by an access network element or the like (i.e. pre-configured spectrum cooperation).

In the following, examples for coordinating a spectrum usage by access network elements of small cells based on an established spectrum cooperation relationship link are described wherein a service coordination is also conducted. In this context, it is to be noted that it is assumed that the involved communication network control elements have configured a function enabling the service coordination according to a pre-defined spectrum sharing incentive agreement (see also S15 of FIG. 2).

FIG. 4 shows a signaling diagram illustrating a communication control using a spectrum sharing based on a spectrum cooperation relationship according to some example versions of the disclosure wherein a spectrum usage granting is individually conducted for each access network element of a small cell, if desired.

In the following, it is assumed that a SCR link is established between at least one access network element (small cell, e.g. OPA_AP1 40) and the OPB network (e.g. to OPB_eNB 30). For example, this is done in accordance with the processing described in connection with FIG. 3.

According to the present example, OPA_AP1 40 shall request for a spectrum usage. For this purpose, a spectrum request is to be issued towards the OPB network (in accordance with e.g. S20 of FIG. 2). For example a corresponding spectrum request is issued by the OPA_eNB 20 in S180 or (as described below) by the OPA_AP1 40. In any case, the spectrum grant request includes service coordination information providing an indication of offered measures for compensation based on roaming mechanism, as described above.

In case the spectrum grant request is not provided by the OPA_eNB 20 but from the OPA_AP1 30 (i.e. the small cell having an SCR with OPB), a processing as indicated in S185 to S200 is conducted (instead of S180).

In S185, the request for a spectrum usage is triggered, for example, by an internal processing in the small cell AP (OPA_AP1 40) itself, for example in case the spectrum sharing is coordinated in distributed way among the small cells in the OPA network, or by an instruction from the OPA's network (e.g. the controlling OPA_eNB 20 or the OPA_O&M 20a), for example, when a spectrum sharing among small cells of the OPA network is centrally controlled by the controlling OPA_eNB 20 or the OPA_O&M 20a.

In S190, the OPA_AP1 40 uses a configured uplink scheduling request (e.g. on PUCCH channel) to contact serving eNB (OPB_eNB 30) and receives in S195 an indication of allocated UL resources. Then, in S200, the OPA_AP1 40 sends a spectrum grant request on the allocated UL resources to the serving OPB_eNB 30. The spectrum grant request in S200 includes service coordination information which are provided by the OPA (i.e. measures offered for compensating the spectrum granting). Furthermore, the spectrum grant request may include information on sensing results (e.g. IDs of detected small cells of the OPB network, a received signal strength or interference power with regard thereto) related to a requested spectrum, which facilitates a processing of the OPB network for granting a usage right of a certain spectrum part.

Based on the information provided by the OPA in either S180 or S200, the OPB network (e.g. the serving OPB_eNB 30 or OPB_O&M 30a) conducts a service coordination processing in S210 and a determination of the spectrum that can be allocated (or granted) to the OPA_AP1 40 as a spectrum user in S220. The processing in S210 corresponds e.g. to the processing in S30 in FIG. 2.

In S230, the OPB network sends, as a response to the request message of S180 or S200, a spectrum grant response message to the OPA (i.e. OPA_eNB 20 or OPA_AP1 40), which includes information about the granted spectrum and also the usage conditions (for example communication timing information, power restrictions etc.), as well as information regarding the accepted service coordination measures based on roaming mechanism. Assuming that the accepted measure is to roam UEs of the OPB to OPA, in S240, a roaming request is sent to UE 50, wherein in S250 the roaming procedure between UE 50 and OPA is executed according to the accepted measure.

According to some example versions of the disclosure, when a spectrum usage is granted by the OPB network to a small cell of the OPA network (e.g. OPA_AP1 40), the OPB network may initiate a measurement of interference caused by OPA_AP1 40 in the OPB network. For this purpose, for example, the OPB network sends a request to one or more small cells of OPB network to measure the interference on the granted spectrum and to report at least strong interferences caused by the OPA_AP1 40. On the basis of the report, the OPB network can decide whether the interference is tolerable or not. If not, the OPB network may either update the spectrum grant to the OPA_AP1 40 given in S230, or even withdraw the granted spectrum. A corresponding adaptation of the accepted measures is then also conducted.

Figure 5:
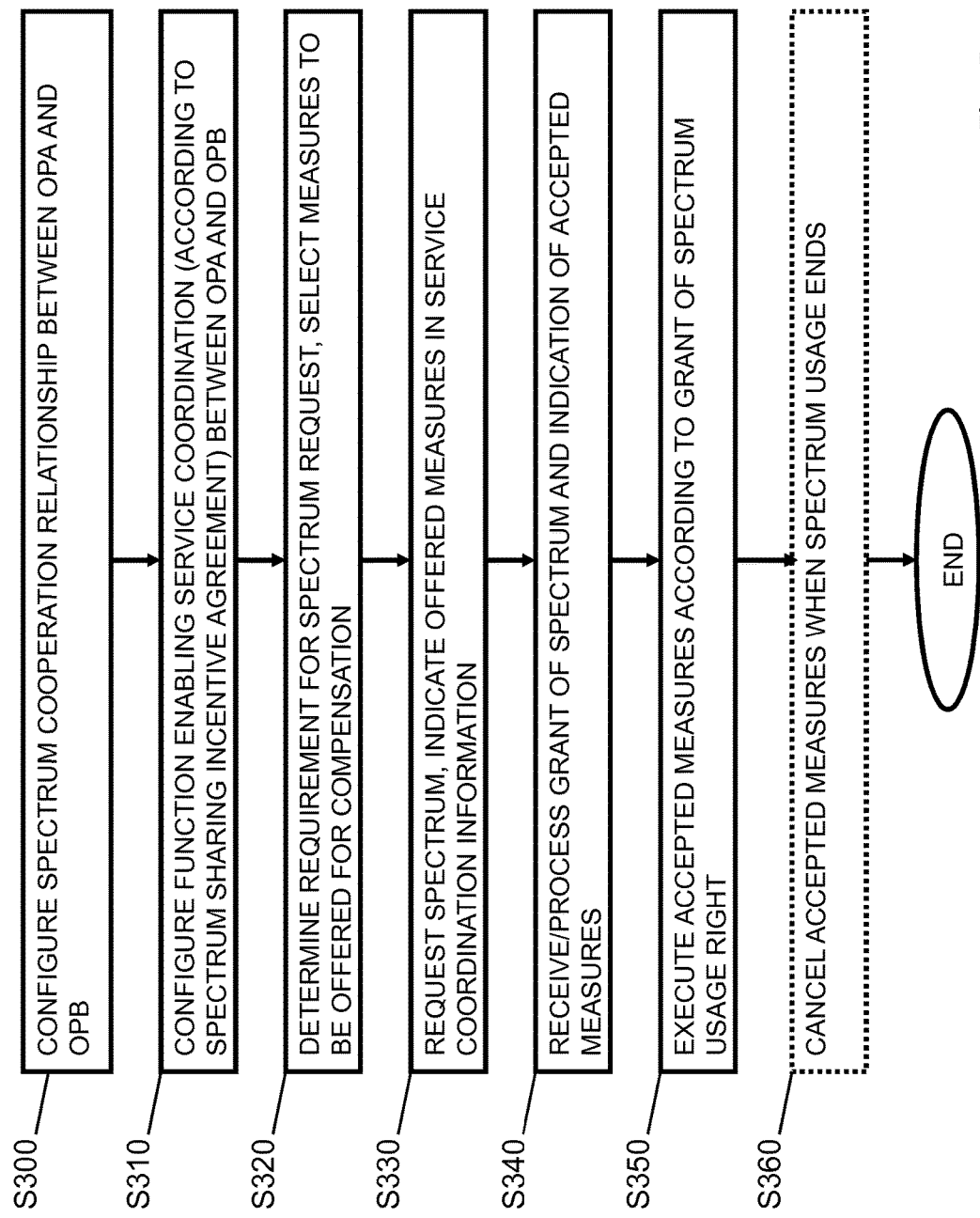
FIG. 5 shows a flow chart of a processing conducted in a communication network control element with regard to a control of a communication using a spectrum sharing based on a spectrum cooperation relationship with service coordination according to some example versions of the disclosure.

FIG. 5 shows a flow chart of a processing conducted in a communication network control element (OPA_eNB 20) with regard to a control of a communication using a spectrum sharing based on a spectrum cooperation relationship with service coordination according to some example versions of the disclosure.

In S300, a processing related to configure an SCR is conducted for allowing that a spectrum allocated to a communication by a second communication network (e.g. OPB) is shared by a first communication network (e.g. OPA).

In S310, a processing related to configure a function for enabling a processing for a service coordination according to rules agreed between the first communication network (OPA) and the second communication network (OPB) according to a spectrum sharing incentive agreement is conducted. According to some example versions of the disclosure, the service coordination negotiation leading to the spectrum sharing incentive agreement is conducted in parallel with a spectrum sharing negotiation and agreement, or at least before requesting for using a part of the spectrum of the second communication network (OPB), so that the rules are known. The spectrum sharing incentive agreement defines at least one of rules for a compensation based on roaming mechanism provided by the first communication network for a spectrum grant provided by the second communication network, rules of a charging setting for communication elements of the respective other communication network, and rules of a usage of resources related to offered measures.

In S320, it is determined that the first communication network (OPA) requires spectrum usage rights from the second communication network (OPB), wherein in addition measures based on roaming mechanism for compensating for a corresponding the spectrum grant are selected on the basis of the spectrum sharing incentive agreement so as to implement a corresponding service coordination.

For example, as a measure based on roaming mechanism being offered by the first communication network allowing the second communication network to obtain compensation in the form of communication resources or traffic for using a part of the spectrum of the second communication network by the first communication network, communication resources of the first communication network are provided for usage by communication elements of the second communication network, wherein the first communication network acts on behalf of the second communication network. In this case, the service coordination information comprises information elements indicating at least one of a communication capacity parameter and a location parameter defining a service area in the first communication network for communication elements of the second communication network. Alternatively or additionally, as a measure based on roaming mechanism being offered by the first communication network allowing the second communication network to obtain compensation in the form of communication resources or traffic for using a part of the spectrum of the second communication network by the first communication network, at least one dedicated communication element of the first communication network is switched so as to be served by the second communication network element instead of the first communication network. In this case, the service coordination information comprises information elements identifying the at least one dedicated communication element and specifying a communication behavior of the at least one dedicated communication element.

According to some example versions of the disclosure, the selection of the measure based on roaming mechanism being offered by the first communication network for allowing the second communication network to obtain compensation in the form of communication resources or traffic for using a part of the spectrum of the second communication network by the first communication network is based on at least one criterion among an amount of spectrum to be requested from the second communication network, a communication load situation in the first communication network, a communication behavior of communication elements in the first communication network.

In S330, a request for using a part of the spectrum of the second communication network (OPB) on the basis of the spectrum cooperation relationship is made wherein service coordination information are included for indicating the offered measures based on roaming mechanism.

In S340, a response to the request for using a part of the spectrum of the second communication network and a service coordination response informing about accepted measures based on roaming mechanism of those being offered in the service coordination information are received and processed. For example, by processing the received service coordination response, information which measures based on roaming mechanism are accepted by the second communication network is derived. Furthermore, the service coordination response may further comprise supporting information usable in the processing for executing the accepted measures based on roaming mechanism, such as information about an allowed area.

In S350, a processing for executing the accepted measures based on roaming mechanism is conducted in accordance with a grant of the request for using a part of the spectrum of the second communication network. For example, in case the offered measure based on roaming mechanism comprises switching of at least one dedicated communication element of the first communication network so as to be served by the second communication network element instead of the first communication network, in S350, a switching instruction is transmitted to the at least one dedicated communication element to conduct a switching procedure (roaming) to switch a communication connection from the first communication network to the second communication network. The switching instruction comprises at least one of an information specifying a target for the switching of the communication connection to the second communication network and an indication that the cause for the switching is based on a service coordination.

In S360, which is conducted when communication elements of the other network (i.e. UE of OPB) camp on the own cells, when it is determined that the usage of the spectrum of the second communication network ends (e.g. OPB has terminated the usage right for the granted spectrum part), a processing is conducted to cancel the accepted measures. For example, a roaming request is sent to the UE of OPB.

Figure 6:
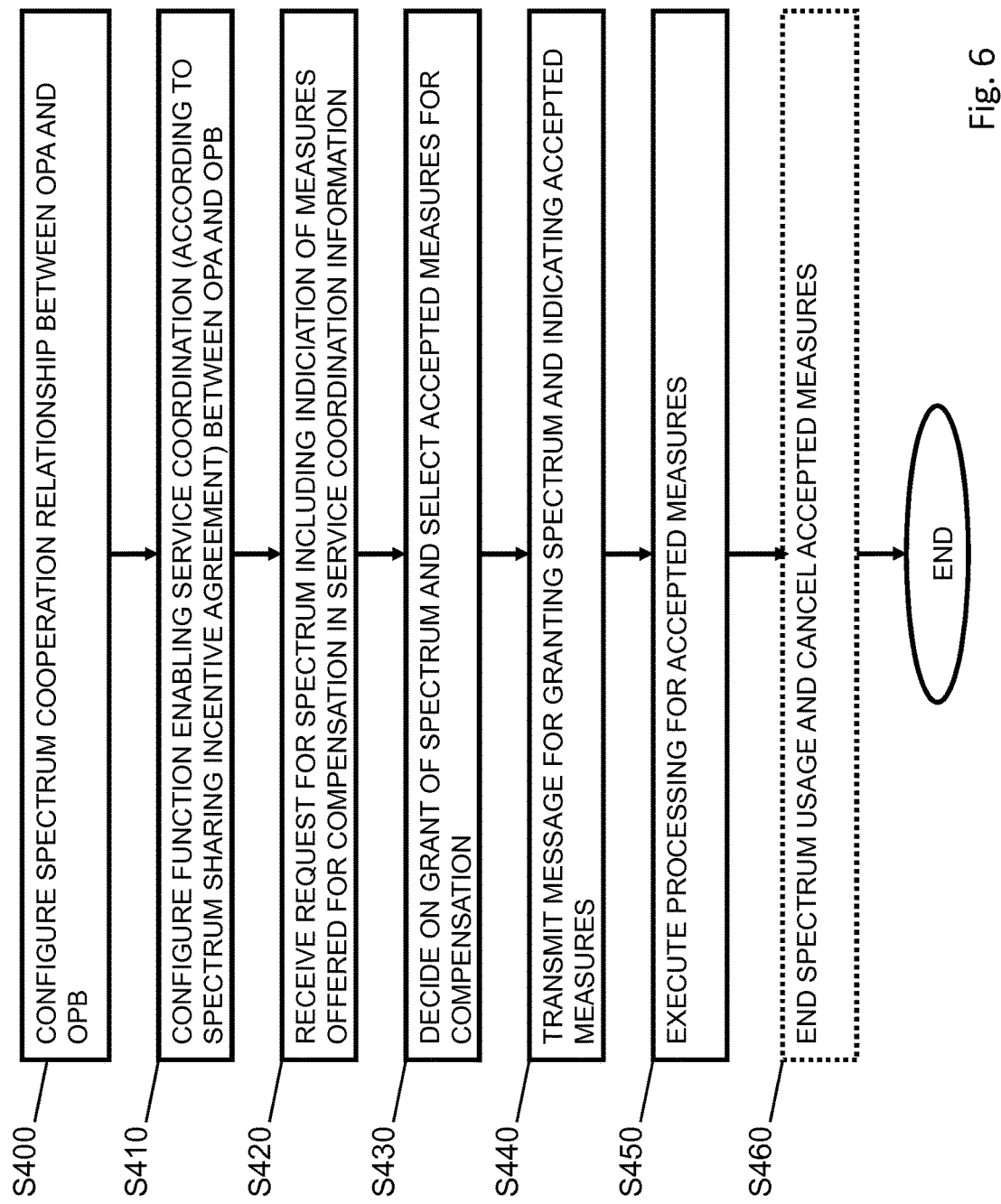
FIG. 6 shows a flow chart of a processing conducted in a communication network control element with regard to a control of a communication using a spectrum sharing based on a spectrum cooperation relationship with service coordination according to some example versions of the disclosure.

FIG. 6 shows a flow chart of a processing conducted in a communication network control element (OPB_eNB 30) with regard to a control of a communication using a spectrum sharing based on a spectrum cooperation relationship with service coordination according to some example versions of the disclosure.

In S400, a processing related to configure an SCR is conducted for allowing that a spectrum allocated to a communication by a second communication network (e.g. OPB) is shared by a first communication network (e.g. OPA).

In S410, a processing related to configure a function for enabling a processing for a service coordination according to rules agreed between the first communication network (OPA) and the second communication network (OPB) according to a spectrum sharing incentive agreement is conducted. According to some example versions of the disclosure, the service coordination negotiation leading to the spectrum sharing incentive agreement is conducted in parallel with a spectrum sharing negotiation and agreement, or at least before a request for using a part of the spectrum of the second communication network is processed (i.e. by the OPB), so that the rules are known. The spectrum sharing incentive agreement defines at least one of rules for a compensation based on roaming mechanism provided by the first communication network for a spectrum grant provided by the second communication network, rules of a charging setting for communication elements of the respective other communication network, and rules of a usage of resources related to offered measures.

In S420, a spectrum request it received and processed which is transmitted from the first communication network (OPA) and indicates that spectrum usage rights are requested from the second communication network (OPB) on the basis of the spectrum cooperation relationship. Service coordination information are included for indicating offered measures based on roaming mechanism for compensating in the form of communication resources or traffic for the spectrum usage which are based on the spectrum sharing incentive agreement.

In S430, it is decided, on the basis of at least one of the request for using a part of the spectrum and the service coordination information, which part of the spectrum of the second communication network is granted to the request. Furthermore, a selection is made which of the offered measures based on roaming mechanism are accepted, based on the service coordination information.

As the accepted measure based on roaming mechanism being offered by the first communication network allowing the second communication network to obtain compensation for using a part of the spectrum of the second communication network by the first communication network, it may be selected to use communication resources of the first communication network for communication elements of the second communication network, wherein the first communication network acts on behalf of the second communication network. In this case, the processed service coordination information comprises information elements indicating at least one of a communication capacity parameter and a location parameter defining a service area in the first communication network for communication elements of the second communication network. Alternatively or additionally, as the accepted measure based on roaming mechanism, it may be selected to accept switching of at least one dedicated communication element of the first communication network so as to be served by the second communication network element instead of the first communication network. In this case, the processed service coordination information comprises information elements identifying the at least one dedicated communication element and specifying a communication behavior of the at least one dedicated communication element.

For example, the selection of the measures based on roaming mechanism offered by the first communication network for allowing the second communication network to obtain compensation in the form of communication resources or traffic for using a part of the spectrum of the second communication network by the first communication network is based on at least one criterion among a requested amount of spectrum of the second communication network, a communication load situation in the second communication network, capacity and location information regarding service areas provided by the first communication network, a communication behavior of communication elements in the first communication network, a communication behavior of communication elements in the second communication network.

In S440, a response to the request for using a part of the spectrum of the second communication network and a service coordination response informing about the accepted measures are transmitted to the requesting network (OPA). The service coordination response includes information which measures are accepted by the second communication network, and, if suitable, supporting information related to the accepted measures based on roaming mechanism.

In S450, a processing is conducted for granting a part of the spectrum to the first communication network and for executing the accepted measures. For example, in case an accepted measure based on roaming mechanism comprises to use communication resources of the first communication network for communication elements of the second communication network, at least one candidate communication element of the second communication network is determined for being switched (roaming) to the first communication network for using the communication resources of the first communication network, wherein a switching instruction to the at least one candidate communication element is transmitted to conduct a switching procedure to switch a communication connection from the second communication network to the first communication network. The switching instruction comprises at least one of an information specifying a target for the switching of the communication connection to the first communication network and an indication that the cause for the switching is based on a service coordination. For example, candidate communication elements are communication elements being in an idle communication state (idle UEs).

In S460, which is conducted when communication elements of the other network (i.e. UE of OPA) camp on the own cells, when it is determined that the usage of the spectrum of the second communication network ends (e.g. OPB has terminated the usage right for the granted spectrum part), a processing is conducted to cancel the accepted measures. For example, a roaming request is sent to the roamed UE of OPA.

Figure 7:
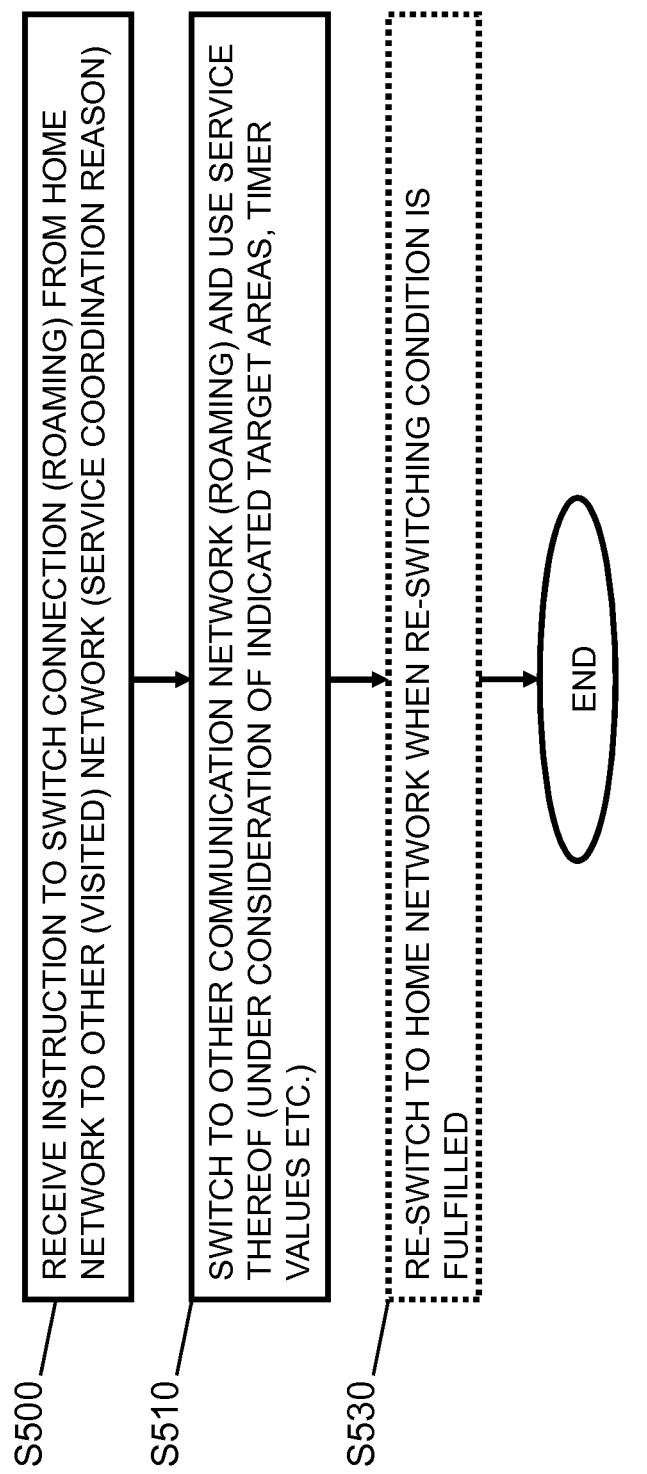
FIG. 7 shows a flow chart of a processing conducted in a communication element with regard to a control of a communication using a spectrum sharing based on a spectrum cooperation relationship with service coordination according to some example versions of the disclosure.

FIG. 7 shows a flow chart of a processing conducted in a communication element (UE 10, UE 50) with regard to a control of a communication using a spectrum sharing based on a spectrum cooperation relationship with service coordination according to some example versions of the disclosure.

In S500, a switching instruction is received from a home communication network (OPA in case of UE 10, OPB in case of UE 50) to switch a communication connection to a another communication network (OPB in case of UE 10, OPA in case of UE 50) with which the home communication network has set up a spectrum cooperation relationship in which a spectrum used for communication by one of the communication networks is allowed to be shared by the other of the communication networks. The switching instruction comprises at least one of an information specifying an allowed target area of the other communication network for switching of the communication connection to the other communication network, a timer indication indicating a time period for remaining switched to the other communication network and for being re-switched to the home communication network, and an indication that the cause for the switching is based on a service coordination between the home communication network and the other communication network.

In S510, a processing for switching the communication connection (roaming) from the home communication network to the other communication network is executed. As a result, services of the other communication network instead of the home communication network are used by the communication element after switching the communication connection. A charging setting for the communication connection with the other communication network corresponds to a charging setting of a communication connection to the home communication network.

In S530, a processing for re-switching the communication connection from the other communication network to the home communication network is conducted. Re-switching is executed when a condition is fulfilled comprising: a timer indicating a time period for remaining switched to the other communication network and for being re-switched to the home communication network expires, an allowed target area of the other communication network is leaved, or a request for switching the communication connection is received from the other communication network.

Figure 8:
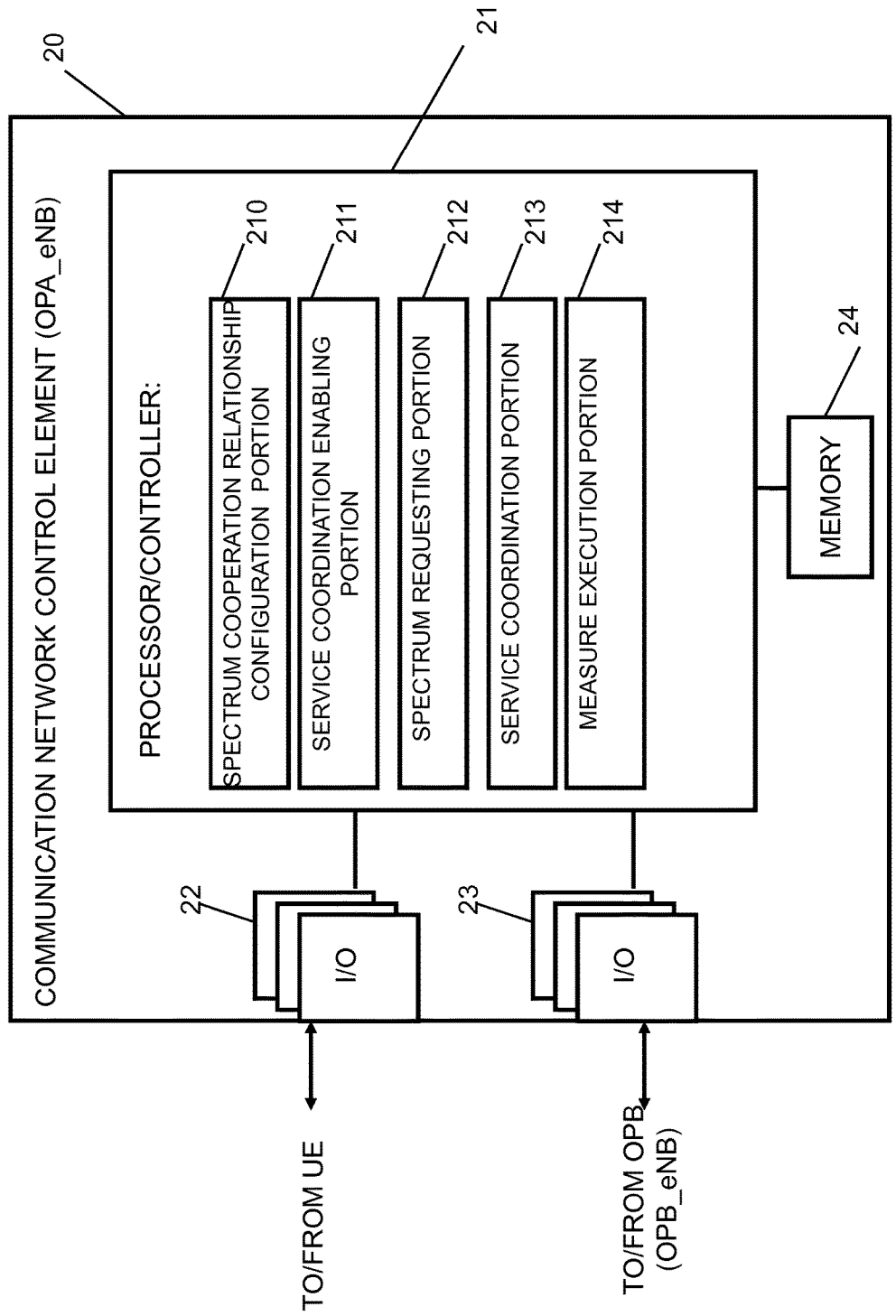
FIG. 8 shows a diagram of a communication network control element including processing portions conducting functions according to some example versions of the disclosure.

In FIG. 8, a diagram illustrating a configuration of a communication network control element, such as of the OPA_eNB 20, is shown, which is configured to implement the communication procedure as described in connection with some example versions of the disclosure. It is to be noted that the communication network control element like the OPA_eNB 20 shown in FIG. 8 may comprise several further elements or functions besides those described herein below. Furthermore, even though reference is made to an eNB, the communication network control element may be also another device having a similar function, such as a chipset, a chip, a module etc., which can also be part of a communication network control element or attached as a separate element to a communication network control element, or the like. It should be understood that each block and any combination thereof may be implemented by various means or their combinations, such as hardware, software, firmware, one or more processors and/or circuitry.

The communication network control element shown in FIG. 8 may comprise a processing function, control unit or processor 21, such as a CPU or the like, which are suitable for executing instructions given by programs or the like related to the communication procedure. The processor 21 may comprise one or more processing portions dedicated to specific processing as described below, or the processing may be run in a single processor. Portions for executing such specific processing may be also provided as discrete elements or within one or more further processors or processing portions, such as in one physical processor like a CPU or in several physical entities, for example. Reference signs 22 and 23 denote transceiver or input/output (I/O) units (interfaces) connected to the processor 21. The I/O units 22 may be used for communicating with one or more communication elements, such as UE 10 or 50. The I/O units 23 may be used for communicating with one or more other networks and their respective communication network control elements, like neighboring cells. The I/O units 22 and 23 may be a combined unit comprising communication equipment towards several network elements, or may comprise a distributed structure with a plurality of different interfaces for different network elements. Reference sign 24 denotes a memory usable, for example, for storing data and programs to be executed by the processor 21 and/or as a working storage of the processor 21.

The processor 21 is configured to execute processing related to the above described communication procedure. In particular, the processor 21 comprises a sub-portion 210 as a processing portion which is usable for configuring a spectrum cooperation relationship. The portion 210 may be configured to perform processing according to S300 of FIG. 5. Furthermore, the processor 21 comprises a sub-portion 211 usable as a portion for enabling a service coordination. The portion 211 may be configured to perform processing according to S310 of FIG. 5. Furthermore, the processor 21 comprises a sub-portion 212 usable as a portion for requesting a spectrum usage right. The portion 212 may be configured to perform a processing according to S320 and S330 of FIG. 5. In addition, the processor 21 comprises a sub-portion 213 usable as a portion for service coordination. The portion 213 may be configured to perform a processing according to S320 and S330 of FIG. 5. Moreover, the processor 21 comprises a sub-portion 214 usable as a portion for executing measures for compensating for spectrum usage. The portion 214 may be configured to perform a processing according to S350 and S360 of FIG. 5.

Figure 9:
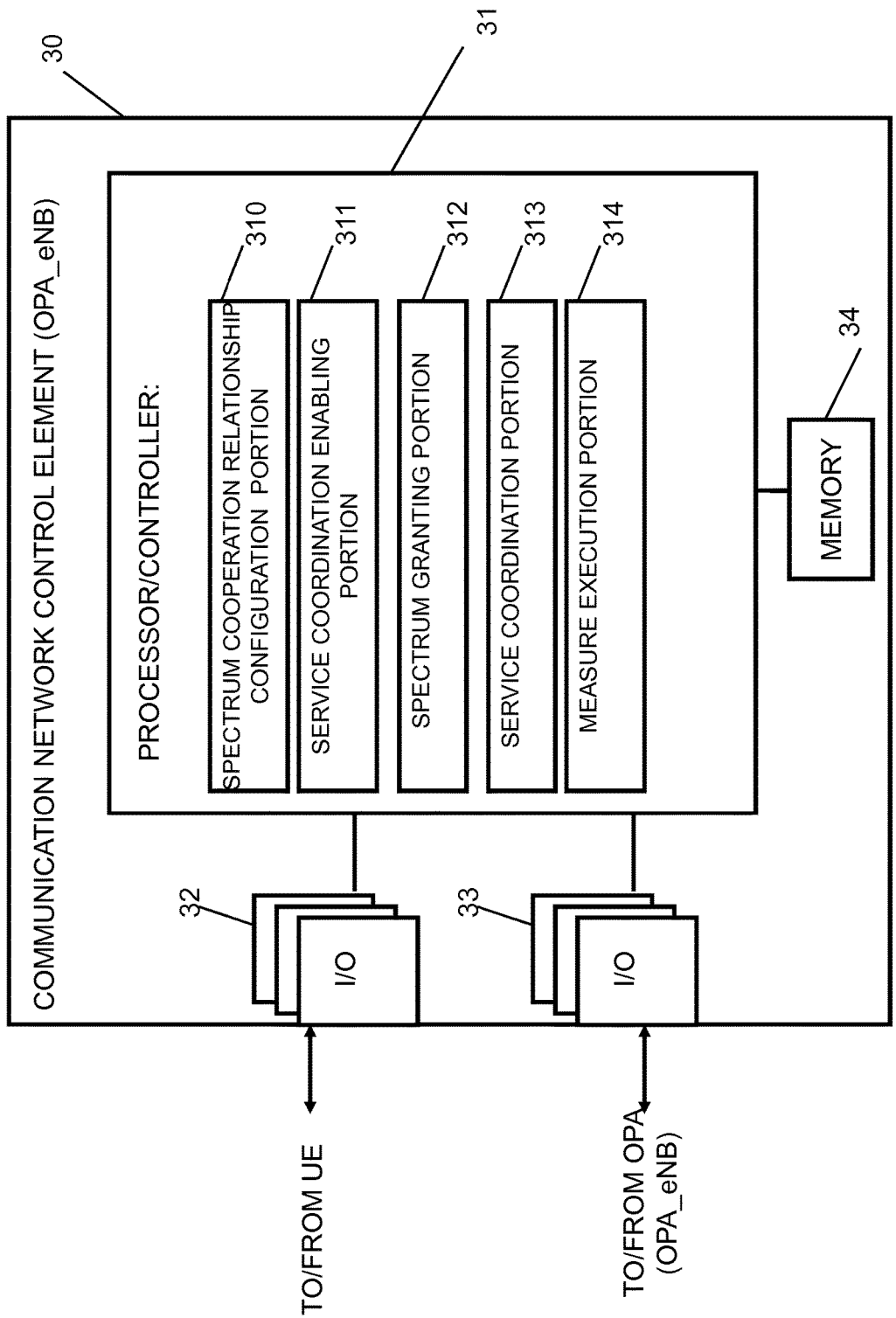
FIG. 9 shows a diagram of a communication network control element including processing portions conducting functions according to some example versions of the disclosure.

In FIG. 9, a diagram illustrating a configuration of a communication network control element, such as of the OPB_eNB 30, is shown, which is configured to implement the communication procedure as described in connection with some example versions of the disclosure. It is to be noted that the communication network control element like the OPB_eNB 30 shown in FIG. 9 may comprise several further elements or functions besides those described herein below. Furthermore, even though reference is made to an eNB, the communication network control element may be also another device having a similar function, such as a chipset, a chip, a module etc., which can also be part of a communication network control element or attached as a separate element to a communication network control element, or the like. It should be understood that each block and any combination thereof may be implemented by various means or their combinations, such as hardware, software, firmware, one or more processors and/or circuitry.

The communication network control element shown in FIG. 9 may comprise a processing function, control unit or processor 31, such as a CPU or the like, which are suitable for executing instructions given by programs or the like related to the communication procedure. The processor 31 may comprise one or more processing portions dedicated to specific processing as described below, or the processing may be run in a single processor. Portions for executing such specific processing may be also provided as discrete elements or within one or more further processors or processing portions, such as in one physical processor like a CPU or in several physical entities, for example. Reference signs 32 and 33 denote transceiver or input/output (I/O) units (interfaces) connected to the processor 31. The I/O units 32 may be used for communicating with one or more communication elements, such as UE 10 or 50. The I/O units 33 may be used for communicating with one or more other networks and their respective communication network control elements, like neighboring cells. The I/O units 32 and 33 may be a combined unit comprising communication equipment towards several network elements, or may comprise a distributed structure with a plurality of different interfaces for different network elements. Reference sign 34 denotes a memory usable, for example, for storing data and programs to be executed by the processor 31 and/or as a working storage of the processor 31.

The processor 31 is configured to execute processing related to the above described communication procedure. In particular, the processor 31 comprises a sub-portion 310 as a processing portion which is usable for configuring a spectrum cooperation relationship. The portion 310 may be configured to perform processing according to S400 of FIG. 6. Furthermore, the processor 31 comprises a sub-portion 311 usable as a portion for enabling a service coordination. The portion 311 may be configured to perform processing according to S410 of FIG. 6. Furthermore, the processor 31 comprises a sub-portion 312 usable as a portion for granting a spectrum usage right. The portion 312 may be configured to perform a processing according to S420 and S430 of FIG. 6. In addition, the processor 31 comprises a sub-portion 313 usable as a portion for service coordination. The portion 313 may be configured to perform a processing according to S420 and S430 of FIG. 6. Moreover, the processor 31 comprises a sub-portion 314 usable as a portion for executing accepted measures for compensating for spectrum usage. The portion 314 may be configured to perform a processing according to S450 and S460 of FIG. 6.

It is to be noted that an communication network control element according to some example versions of the disclosure may comprise components corresponding to both configurations as shown in FIGS. 8 and 9.

Figure 10:
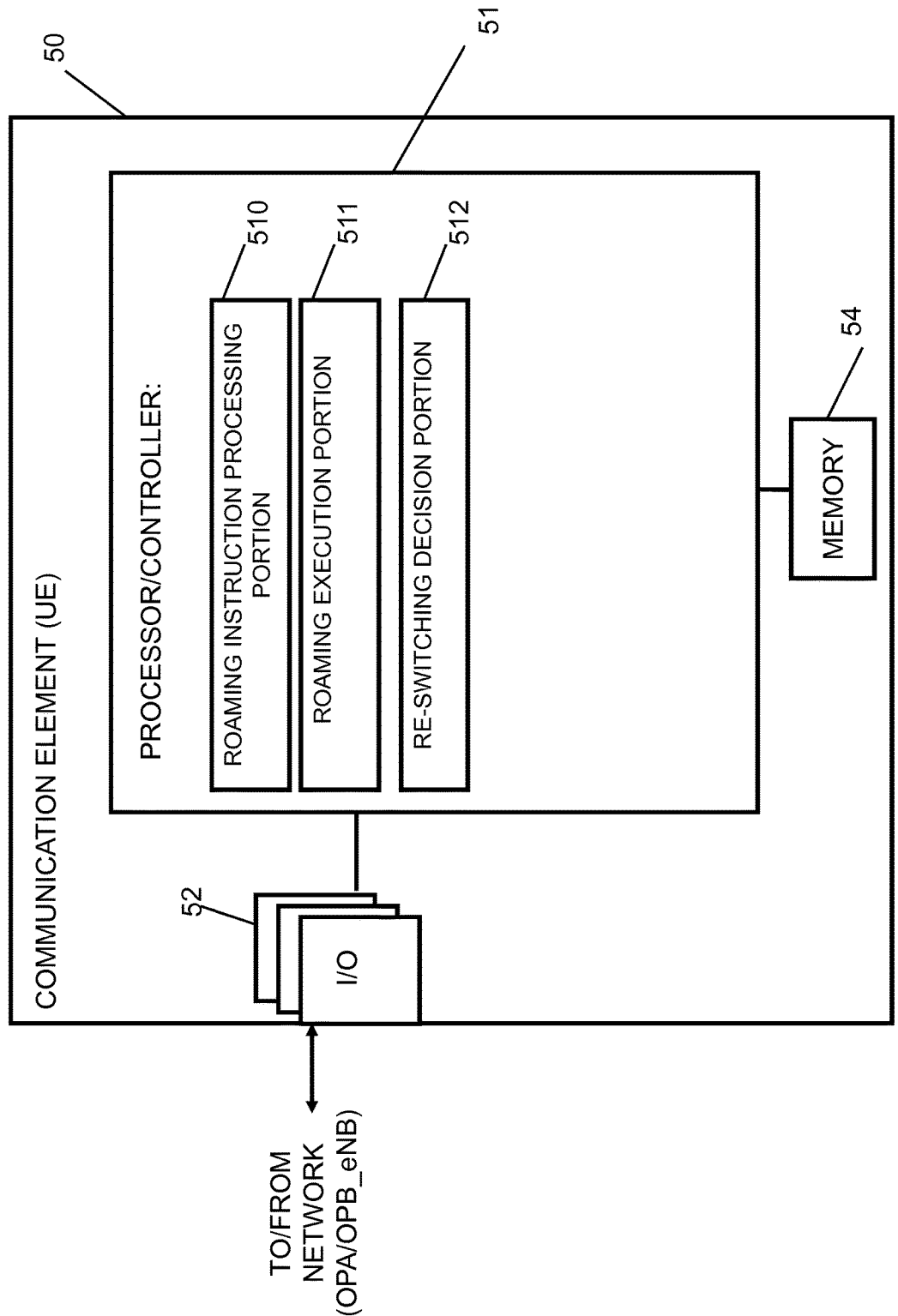
FIG. 10 shows a diagram of a communication element including processing portions conducting functions according to some example versions of the disclosure.

In FIG. 10, a diagram illustrating a configuration of a communication element, such as of the UE 10 or UE 50, is shown, which is configured to implement the communication procedure as described in connection with some example versions of the disclosure. It is to be noted that the communication element like the UE 10 or 50 shown in FIG. 10 may comprise several further elements or functions besides those described herein below. Furthermore, even though reference is made to an UE, the communication element may be also another device having a similar function, such as a chipset, a chip, a module etc., which can also be part of a communication element or attached as a separate element to a communication element, or the like. It should be understood that each block and any combination thereof may be implemented by various means or their combinations, such as hardware, software, firmware, one or more processors and/or circuitry.

The communication element shown in FIG. 10 may comprise a processing function, control unit or processor 51, such as a CPU or the like, which are suitable for executing instructions given by programs or the like related to the communication procedure. The processor 51 may comprise one or more processing portions dedicated to specific processing as described below, or the processing may be run in a single processor. Portions for executing such specific processing may be also provided as discrete elements or within one or more further processors or processing portions, such as in one physical processor like a CPU or in several physical entities, for example. Reference sign 52 denotes transceiver or input/output (I/O) units (interfaces) connected to the processor 31. The I/O units 32 may be used for communicating with one or more communication network control elements, such as eNBs. The I/O units 52 may be a combined unit comprising communication equipment towards several network elements, or may comprise a distributed structure with a plurality of different interfaces for different network elements. Reference sign 54 denotes a memory usable, for example, for storing data and programs to be executed by the processor 51 and/or as a working storage of the processor 51.

The processor 51 is configured to execute processing related to the above described communication procedure. In particular, the processor 51 comprises a sub-portion 510 as a processing portion which is usable for processing a roaming instruction. The portion 510 may be configured to perform processing according to S500 of FIG. 7. Furthermore, the processor 51 comprises a sub-portion 511 usable as a portion for executing a roaming procedure. The portion 511 may be configured to perform processing according to S510 of FIG. 7. Furthermore, the processor 51 comprises a sub-portion 512 usable as a portion for re-switching a connection to a home network. The portion 512 may be configured to perform a processing according to S520 of FIG. 7.

According to a further example version of the disclosure, there is provided an apparatus comprising
  requesting means for requesting for using a part of a spectrum of a second communication network on the basis of a spectrum cooperation relationship between a first communication network and the second communication network,
  informing means for providing a service coordination information related to the request for using a part of the spectrum, the service coordination information indicating measures based on roaming mechanism offered by the first communication network allowing the second communication network to obtain compensation in the form of communication resources or traffic for using a part of the spectrum of the second communication network by the first communication network, and
  processing means for receiving and processing a response to the request for using a part of the spectrum of the second communication network and a service coordination response informing about accepted measures of those being offered in the service coordination information.

According to a further example version of the disclosure, there is provided an apparatus comprising processing means for receiving and processing a request for using a part of a spectrum of a second communication network by a first communication network on the basis of a spectrum cooperation relationship between the first communication network and the second communication network, processing means for receiving and processing a service coordination information related to the request for using a part of the spectrum, the service coordination information indicating measures based on roaming mechanism offered by the first communication network allowing the second communication network to obtain compensation in the form of communication resources or traffic for using a part of the spectrum of the second communication network by the first communication network, deciding means for deciding, on the basis of at least one of the request for using a part of the spectrum and the service coordination information, which part of the spectrum of the second communication network is granted to the request, selecting means for selecting, on the basis of the service coordination information, measures based on roaming mechanism to be accepted, and transmitting means for transmitting a response to the request for using a part of the spectrum of the second communication network and a service coordination response informing about the accepted measures based on roaming mechanism.

According to a further example version of the disclosure, there is provided an apparatus comprising processing means for receiving and processing a switching instruction from a home communication network to switch a communication connection to a another communication network with which the home communication network has set up a spectrum cooperation relationship in which a spectrum used for communication by one of the communication networks is allowed to be shared by the other of the communication networks, processing means for conducting a processing for switching the communication connection from the home communication network to the other communication network, and processing means for using services of the other communication network instead of the home communication network after switching the communication connection.

It should be appreciated that an access technology via which signaling is transferred to and from a network element may be any suitable present or future technology, such as WLAN (Wireless Local Access Network), WiMAX (Worldwide Interoperability for Microwave Access), LTE, LTE-A, Bluetooth, Infrared, and the like may be used; Additionally, embodiments may also apply wired technologies, e.g. IP based access technologies like cable networks or fixed lines.—a user device (also called UE, user equipment, user terminal, terminal device, etc.) illustrates one type of an apparatus to which resources on the air interface may be allocated and assigned, and thus any feature described herein with a user device may be implemented with a corresponding apparatus, such as a relay node. An example of such a relay node is a layer 3 relay (self-backhauling relay) towards the base station or eNB. The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. It should be appreciated that a device may be regarded as an apparatus or as an assembly of more than one apparatus, whether functionally in cooperation with each other or functionally independently of each other but in a same device housing.

embodiments suitable to be implemented as software code or portions of it and being run using a processor are software code independent and can be specified using any known or future developed programming language, such as a high-level programming language, such as objective-C, C, C++, C#, Java, etc., or a low-level programming language, such as a machine language, or an assembler,—implementation of embodiments, is hardware independent and may be implemented using any known or future developed hardware technology or any hybrids of these, such as a microprocessor or CPU (Central Processing Unit), MOS (Metal Oxide Semiconductor), CMOS (Complementary MOS), BiMOS (Bipolar MOS), BiCMOS (Bipolar CMOS), ECL (Emitter Coupled Logic), and/or TTL (Transistor-Transistor Logic).

embodiments may be implemented as individual devices, apparatuses, units or means or in a distributed fashion, for example, one or more processors may be used or shared in the processing, or one or more processing sections or processing portions may be used and shared in the processing, wherein one physical processor or more than one physical processor may be used for implementing one or more processing portions dedicated to specific processing as described, an apparatus may be implemented by a semiconductor chip, a chipset, or a (hardware) module comprising such chip or chipset;

embodiments may also be implemented as any combination of hardware and software, such as ASIC (Application Specific IC (Integrated Circuit)) components, FPGA (Field-programmable Gate Arrays) or CPLD (Complex Programmable Logic Device) components or DSP (Digital Signal Processor) components.

embodiments may also be implemented as computer program products, comprising a computer usable medium having a computer readable program code embodied therein, the computer readable program code adapted to execute a process as described in embodiments, wherein the computer usable medium may be a non-transitory medium. Computer program products, also called programs or computer programs, including software routines, applets and macros, may be stored in any apparatus-readable data storage medium and they comprise program instructions to perform one or more particular tasks. A computer program product may comprise one or more computer-executable components which, when the program is run, are configured to carry out embodiments. The one or more computer-executable components may be at least one software code or portions of it.

Although the present invention has been described herein before with reference to particular embodiments thereof, the present invention is not limited thereto and various modifications can be made thereto.

The invention claimed is:

1. An apparatus comprising:
    at least one processor,
    and
    at least one memory for storing instructions to be executed by the processor, wherein
    the at least one memory and the instructions are configured to, with the at least one processor, cause the apparatus to at least:
        request to use a part of a spectrum of a second communication network on the basis of a spectrum cooperation relationship between a first communication network and the second communication network,
        provide a service coordination information related to the request to use a part of the spectrum, the service coordination information indicating a plurality of offered compensation measures based on roaming mechanism offered by the first communication network to compensate the second communication network for allowing the first communication network to use a part of the spectrum of the second communication network, wherein the plurality of offered compensation measures include at least one of an offer of communication resources to allow user equipments (UEs) of the second communication network to roam to the first communication network, and an offer to switch traffic of one or more UEs from the first communication network to the second communication network, and
        receive and process a response to the request to use a part of the spectrum of the second communication network and a service coordination response indicating an accepted compensation measure of the plurality of offered compensation measures that are being offered in the service coordination information.

2. The apparatus according to claim 1, wherein the at least one memory and the instructions are further configured to, with the at least one processor, cause the apparatus to at least:
    conduct a processing related to configure the spectrum cooperation relationship related to the usage of the spectrum of the second communication network in a sharing manner by the first communication network.

3. The apparatus according to claim 1, wherein the at least one memory and the instructions are further configured to, with the at least one processor, cause the apparatus to at least:
    derive, from the received and processed service coordination response, information indicating the compensation measure, of the plurality of offered compensation measures, that is accepted by the second communication network, and
    to conduct a processing for executing the accepted compensation measure based on a roaming mechanism in accordance with a grant of the request to use a part of the spectrum of the second communication network.

4. The apparatus according to claim 1, wherein the at least one memory and the instructions are further configured to, with the at least one processor, cause the apparatus to at least:
    determine that the usage of the spectrum of the second communication network ends, and
    cancel the accepted compensation measure based on a roaming mechanism.

5. The apparatus of claim 1 wherein the plurality of offered compensation measures comprise an offer of communication resources to allow user equipments (UEs) of the second communication network to roam to the first communication network, and an offer to switch traffic of one or more UEs from the first communication network to the second communication network and allow the switched UEs to be charged by the second communication network.

6. A method comprising:
    requesting to use a part of a spectrum of a second communication network on the basis of a spectrum cooperation relationship between a first communication network and the second communication network,
    providing a service coordination information related to the request to use a part of the spectrum, the service coordination information indicating a plurality of offered compensation measures based on roaming mechanism offered by the first communication network to compensate the second communication network for allowing the first communication network to use a part of the spectrum of the second communication network, wherein the plurality of offered compensation measures include at least one of an offer of communication resources to allow user equipments (UEs) of the second communication network to roam to the first communication network, and an offer to switch traffic of one or more UEs from the first communication network to the second communication network, and
    receiving and processing a response to the request to use a part of the spectrum of the second communication network and a service coordination response indicating an accepted compensation measure of the plurality of offered compensation measures that are being offered in the service coordination information.

7. The method according to claim 6, further comprising:
    conducting a processing related to configure the spectrum cooperation relationship related to the usage of the spectrum of the second communication network in a sharing manner by the first communication network.

8. The method according to claim 6, further comprising:
    deriving, from the received and processed service coordination response, information indicating the compensation measure, of the plurality of offered compensation measures, that is accepted by the second communication network, and
    executing the accepted compensation measure in accordance with a grant of the request to use a part of the spectrum of the second communication network.

9. The method according to claim 6, further comprising:
    determining that the usage of the spectrum of the second communication network ends, and
    cancelling the accepted compensation measure based on a roaming mechanism.

10. The method of claim 6 wherein the plurality of offered compensation measures comprise an offer of communication resources to allow user equipments (UEs) of the second communication network to roam to the first communication network, and an offer to switch traffic of one or more UEs from the first communication network to the second communication network and allow the switched UEs to be charged by the second communication network.

11. An apparatus comprising:
    at least one processor,
    and
    at least one memory for storing instructions to be executed by the processor, wherein
    the at least one memory and the instructions are configured to, with the at least one processor, cause the apparatus to at least:
        receive and process a request to use a part of a spectrum of a second communication network by a first communication network on the basis of a spectrum cooperation relationship between the first communication network and the second communication network, receive and process a service coordination information related to the request to use a part of the spectrum, the service coordination information indicating a plurality of offered compensation measures based on roaming mechanism offered by the first communication network to compensate the second communication network for allowing the first communication network to use a part of the spectrum of the second communication network, wherein the plurality of offered compensation measures include at least one of an offer of communication resources to allow user equipments (UEs) of the second communication network to roam to the first communication network, and an offer to switch traffic of one or more UEs from the first communication network to the second communication network, decide, on the basis of at least one of the request to use a part of the spectrum and the service coordination information, which part of the spectrum of the second communication network is granted to the request, select, on the basis of the service coordination information, an accepted compensation measure of the plurality of offered compensation measures based on roaming mechanism, and cause to transmit a response to the request to use a part of the spectrum of the second communication network and a service coordination response informing about the accepted compensation measure based on roaming mechanism.

12. The apparatus according to claim 11, wherein the at least one memory and the instructions are further configured to, with the at least one processor, cause the apparatus to at least:

configure the spectrum cooperation relationship related to the usage of the spectrum of the second communication network in a sharing manner by the first communication network.

13. The apparatus according to claim 11, wherein the at least one memory and the instructions are further configured to, with the at least one processor, cause the apparatus to at least:

include, in the transmitted service coordination response, information indicating the compensation measure that has been accepted by the second communication network, and conduct a processing for granting a part of the spectrum to the first communication network and for executing the accepted compensation measure based on roaming mechanism.

14. The apparatus according to claim 11, wherein the at least one memory and the instructions are further configured to, with the at least one processor, cause the apparatus to at least:

decide that the usage of the spectrum of the second communication network is to be ended, and conduct a processing to cancel the accepted compensation measure based on roaming mechanism.

15. The apparatus of claim 11 wherein the plurality of offered compensation measures comprise an offer of communication resources to allow user equipments (UEs) of the second communication network to roam to the first communication network, and an offer to switch traffic of one or more UEs from the first communication network to the second communication network and allow the switched UEs to be charged by the second communication network.

16. A method comprising:

receiving and processing a request to use a part of a spectrum of a second communication network by a first communication network on the basis of the spectrum cooperation relationship between the first communication network and the second communication network, receiving and processing a service coordination information related to the request to use a part of the spectrum, the service coordination information indicating a plurality of offered compensation measures based on roaming mechanism offered by the first communication network to compensate the second communication network for allowing the first communication network to use a part of the spectrum of the second communication network, wherein the plurality of offered compensation measures include at least one of an offer of communication resources to allow user equipments (UEs) of the second communication network to roam to the first communication network, and an offer to switch traffic of one or more UEs from the first communication network to the second communication network, deciding, on the basis of at least one of the request to use a part of the spectrum and the service coordination information, which part of the spectrum of the second communication network is granted to the request, selecting, on the basis of the service coordination information, an accepted compensation measure of the plurality of offered compensation measures based on roaming mechanism, and causing to transmit a response to the request to use a part of the spectrum of the second communication network and a service coordination response informing about the accepted compensation measure based on roaming mechanism.

17. The method according to claim 16, further comprising:

conducting a processing related to configure the spectrum cooperation relationship related to the usage of the spectrum of the second communication network in a sharing manner by the first communication network.

18. The method according to claim 16, further comprising:

including, in the transmitted service coordination response, information indicating the compensation measure that has been accepted by the second communication network, and conducting a processing for granting a part of the spectrum to the first communication network and for executing the accepted compensation measure based on roaming mechanism.

19. The method according to claim 16, further comprising:

deciding that the usage of the spectrum of the second communication network is to be ended, and conducting a processing to cancel the accepted compensation measure based on roaming mechanism.

20. The method of claim 16 wherein the plurality of offered compensation measures comprise an offer of communication resources to allow user equipments (UEs) of the second communication network to roam to the first communication network, and an offer to switch traffic of one or more UEs from the first communication network to the second communication network and allow the switched UEs to be charged by the second communication network.

* * * * *